United States Patent [19]
Lee et al.

[11] Patent Number: 6,102,961
[45] Date of Patent: Aug. 15, 2000

[54] METHOD AND APPARATUS FOR SELECTING IP BLOCKS

[75] Inventors: Sherman Lee, Campbell; Adriana Chiocchi, San Jose; Manuel Hernandez, San Francisco; Martha Amram, Palo Alto, all of Calif.; Robert Pindyck, Newton, Mass.

[73] Assignee: Cadence Design Systems, Inc., San Jose, Calif.

[21] Appl. No.: 09/323,174

[22] Filed: May 27, 1999

Related U.S. Application Data

[60] Provisional application No. 60/087,168, May 29, 1998.

[51] Int. Cl.$^7$ ............................................. G06F 17/50
[52] U.S. Cl. ............................ 716/1; 716/4; 716/10
[58] Field of Search ............................ 395/500.27, 500.11, 395/500.02, 500.03; 716/1, 4, 10

[56] References Cited

U.S. PATENT DOCUMENTS

| | | | |
|---|---|---|---|
| 5,033,014 | 7/1991 | Carver et al. | 703/1 |
| 5,446,885 | 8/1995 | Moore et al. | 707/103 |
| 5,563,801 | 10/1996 | Lee et al. | 716/16 |
| 5,752,238 | 5/1998 | Dedrick | 705/14 |
| 5,809,282 | 9/1998 | Cooper et al. | 709/226 |

OTHER PUBLICATIONS

Borel; "Technologies for Multimedia Systems on a Chip"; IEEE 1997 Solid–State Circuits Conf.; pp. 18–21, Feb. 1997.

Zorian; "Test Requirements for Embedded Core–Based Systems and IEEE P1500"; IEEE 1997 Test Conf.; pp. 191–199, Nov. 1997.

Martin; "Design Methodologies for System Level IP"; IEEE Proc. Design, Automation and Test in Europe; pp. 286–289, Feb. 1998.

Clarke, "Scotland crafts a clearinghouse for core trading", *Electrical Engineering Times*, (Apr. 27, 1998).

Dixit et al., *Investment under Uncertainty*, Princeton University Press, contents, preface, and chapter 1: "A New View of Investment", pp. vii–25 (1994).

Lanjouw et al., "Preliminary Injunctive Relief: Theory and Evidence from Patent Litigation", Harvard Business School Working Paper #96–068, NBER Working Paper No. 5689, pp. 1–31 and figures 1–5 and Tables 1–6 (Jan. 1997).

Maniwa, "Mixing Cores Stirs Legal Issues", *Virtual Chip Design,* circular 56,101: 1–4, (Nov. 1997).

Corman, "To Wait or Not to Wait", *CFO The Magazine for Senior Financial Executives,* pp. 91–94 (May 1997).

Reed, "Valuation of Intellectual Property for Licensing or Sale: What's it Worth?", Oral Presentation at the American Conference Institute, pp. 1–42 (May 18 and 19, 1995).

Santarini et al., "Core–Licensing Primer: From 'A' to 'Free'", *The Business Model,* IP20–IP22 (Mar. 1998).

Sullivan et al., "Software Design as an Investment Activity: A Real Options Perspective", Abstract, pp. 1–44 (Nov. 24, 1998).

Time to Market Associates, Inc., "KMET Korner #'s 79, 81, 82, 83, 84, 85", *Electronic Design,* pp. 79, 81–85.

*Primary Examiner*—Kevin J. Teska
*Assistant Examiner*—Hugh Jones
*Attorney, Agent, or Firm*—Townsend and Townsend and Crew LLP

[57] ABSTRACT

According to the invention, a method for valuing the contribution of IP Blocks into integrated circuit (IC) designs includes implementing a novel concept for valuing technical and economic factors. Based upon such factors, users can more reliably value, select and use IP Blocks for their IC design that furthers their objectives. In an embodiment according to the present invention, a method for determining a group of IP Blocks from a plurality of IP Blocks to incorporate into a circuit design includes the steps of determining a circuit architecture to be implemented by the circuit design, and determining a valuation for implementing the circuit architecture.

18 Claims, 15 Drawing Sheets

Step 210 of Fig. 3;
Step 310 of Fig. 4

Step 420 of Fig. 5

Step 400 of Fig. 5

*Step 620 of Fig. 7A*

Step 410 of Fig. 5

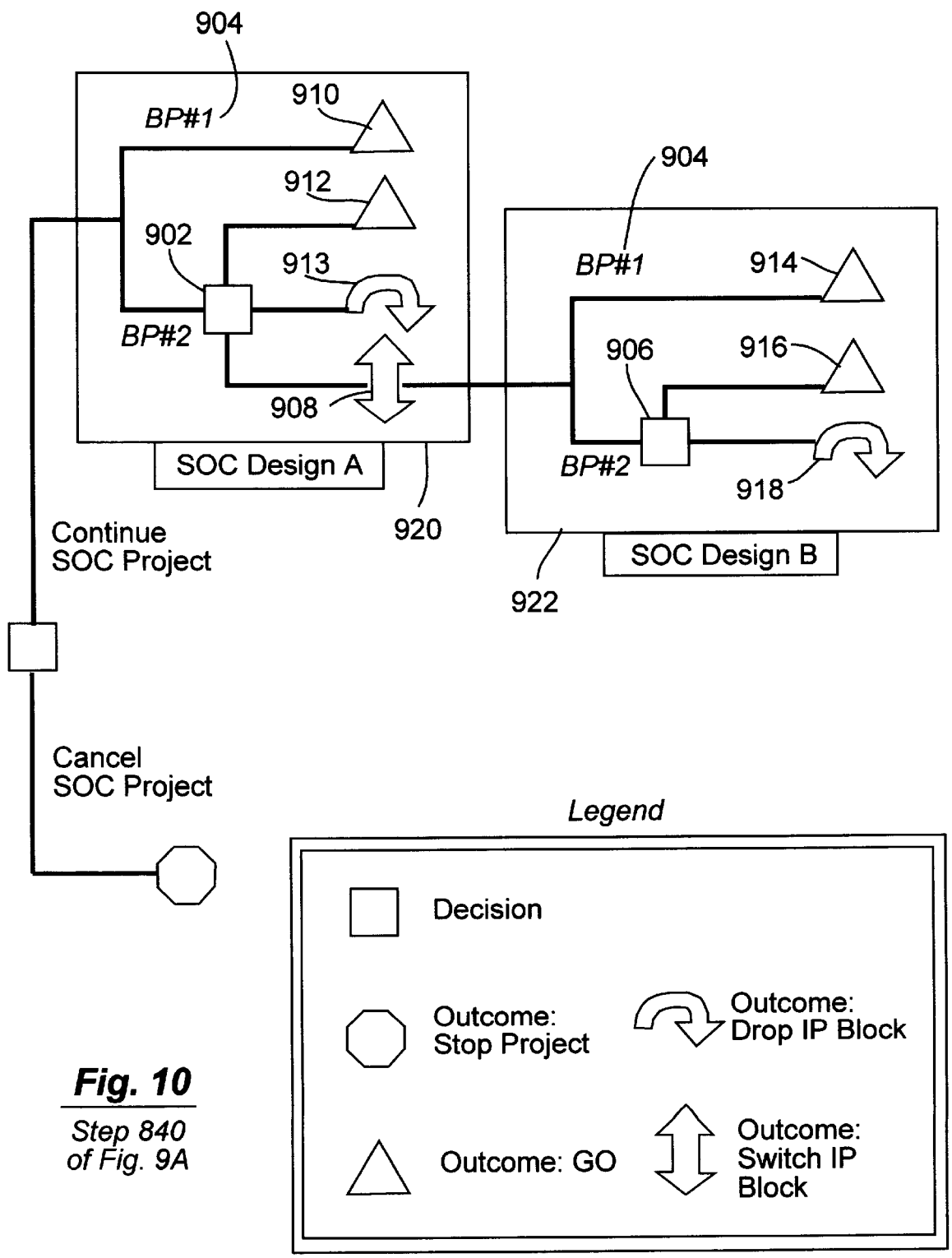

METHOD AND APPARATUS FOR SELECTING IP BLOCKS

CROSS-REFERENCES TO RELATED APPLICATIONS

This application claims priority from the following U.S. Provisional Patent Application, the disclosure of which, including all appendices and all attached documents, is incorporated by reference in its entirety for all purposes:

U.S. Provisional Patent Application Ser. No. 60/087,168, Sherman Lee et. al. entitled, "METHOD AND APPARATUS FOR SELECTING IP BLOCKS," filed May 29, 1998.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention generally relates to the field of "intellectual property" (IP) blocks. In particular, the present invention relates to determining IP block usage in a circuit design and methods for valuing IP blocks. Exemplary embodiments enable users to select which IP Blocks to incorporate into integrated circuit (IC) designs, including a broad range of devices such as application specific integrated circuit (ASIC) designs, system on chip (SOC) designs, and the like.

BACKGROUND OF THE INVENTION

At one time, the computer and electronics industries were dominated by large, vertically integrated firms such as IBM, Sperry and Univac. As illustrated by industry structure model 10 of FIG. 1, these monolithic companies included divisions that architected and designed electronic and computer systems; divisions that architected and designed general purpose or custom integrated circuits (chips); and divisions that developed semiconductor fabrication processes and, in turn, used these processes to manufacture chips. Out of necessity, the software tools and utilities required to effectively perform the various engineering tasks were developed and written by other groups internal to the particular firm. In conjunction with the above efforts, such firms typically developed and wrote their own software tools and utilities required to effectively perform the various engineering tasks. In addition, after several years of development, each firm had developed a large library of components and circuits designs required to build and integrate their proprietary systems and chips. Such circuit designs are commonly termed "intellectual property" blocks (IP Blocks).

In the recent past, because of the increasing level of technical complexity and the need to differentiate their system product offerings, the business model for computer and electronics industries has changed. As illustrated by industry structure model 20 in FIG. 1, many companies have become less vertically oriented, and have become specialized in particular business areas such as systems or semiconductors. For example, system houses have become oriented towards system integration and custom chip design to differentiate their systems, and have relied upon companies that specialized in fabrication for the production of custom chips. Companies such as Compaq Computer Corporation, and the like are generally regarded as system houses. Further, semiconductor houses have become oriented towards design and fabrication of chips that service a wide range of system applications, and have relied upon system houses to utilize these devices. Companies such as Advanced Micro Devices and National Semiconductor and the like are generally regarded as semiconductor houses.

In conjunction with recent efforts, such system and semiconductor houses have promoted the development of the electronic design and automation (EDA) tools industry and now rely upon EDA software tools, such as those provided by Cadence Design Systems, Incorporated, to develop their system and chip designs. The IP Block portfolios of both the system and chip houses have become very significant, but the ability to use these large portfolios in new designs or products that require the mix-and-match of one of more IP Block have not been overly successful.

More recently, because of the increasing pace of technical innovation, the increasing transistor density per chip and the ever increasing time-to-market requirements, the business model for computer and electronics industries continues to evolve at a rapid rate. As illustrated by industry structure model 30 in FIG. 1, companies are becoming even more specialized in particular business areas. There are now companies that specialize in system integration, or in chip design without fabrication, or in chip fabrication, or in EDA tools, or in the creation of mix-and-match IP Blocks.

In light of the fracturing of the vertically integrated business model, the number of companies that specialize in the creation or authoring of re-useable circuit and IP Block designs alone is increasing. As a result, the amount and types of IP Blocks developed by such companies is also increasing.

The ability to integrate tens and even hundreds of millions of transistors on a single silicon substrate is dramatically changing the way integrated circuits (ICs) are defined, designed and implemented. This technical paradigm shift is requiring the industry to re-use previously designed circuits or IP Blocks in their designs to meet the critical objectives such as time-to-market requirements demanded in consumer electronic markets, and the like.

In the future, no one company will realistically have the capabilities or IP Block portfolio to serve all the increasing needs of a particular electronics market segment. Thus, for custom semiconductor applications (system-on-a-chip "SOC" applications) the purchase or license of IP Blocks from third parties is becoming necessary.

Current methods of valuing IP Blocks are typically ad-hoc and may include intangible factors and unreasonable expectations. As an example, intangible factors may include emotional attachment, and the like; and unreasonable expectations may include charging the full cost of non-recurring-engineering (NRE) charges to the first IP Block licensee, or using a "rule of thumb" approach (IP Block price is 25% the value of the end-product), and the like.

Other methods for valuing IP Blocks using more conventional methods, such as net-present-value (NPV) analysis tend to undervalue the worth of a project. Also, NPV calculations can not correctly value the ability to delay a project.

As a result of the current lack or inadequacies of tangible ways to value IP Blocks, the negotiation processes are inefficient and protracted and the royalty structures are often irrational which ultimately causes missed market windows and opportunities. For example, with a project requiring IP Blocks from several different sources, the negotiation process, etc. must be repeated, possibly causing the project to be delayed or canceled. Further, each negotiation process may result in widely different and unexpected obligations.

Other drawbacks to current methods include that the determination of value for IP Blocks from one vendor typically has no effect on IP Block valuation from another vendor. Further, because royalty structures for IP Blocks can often be unpredictable, it is difficult for the industry to accurately estimate the cost-to-market of products requiring third party IP Blocks. For example, if one were to use the rule of thumb (25%) approach to a design, if four different IP Blocks are used in a design, all revenue is committed to the IP Block providers (4×25%=100%). Because, according to this method, no economic incentive is afforded to the manufacturer when 100% of its revenues are committed, the valuation of the IP Blocks must be adjusted.

Thus what is needed are methods and apparatus for efficiently determining which IP Blocks to incorporate into a SOC design. Further, what is needed are efficient and consistent methods for determining the value of IP Blocks.

SUMMARY OF THE INVENTION

A new method for valuing the contribution of IP Blocks into integrated circuit (IC) designs includes implementing a novel concept for valuing technical and economic factors. Based upon such factors, users can more reliably value, select and use IP Blocks for their IC design that furthers their objectives.

According to an embodiment of the present invention a method for determining a group of IP Blocks from a first plurality of IP Blocks to incorporate into a circuit design includes the steps of determining a circuit architecture to be implemented by the circuit design, and determining an architecture profile for implementing the circuit architecture. Profiles comprise specific information relating to the design. For example a design profile can include items such as cost estimates, human resources requirements estimates, estimates of duration of projects and the like. Steps of determining a first design profile for designing the circuit architecture with a first group of IP Blocks from the first plurality of IP Blocks and a second design profile for designing the circuit architecture with a second group of IP Blocks the first plurality of IP Blocks are also included in the method. The method also includes the steps of determining a first integration profile the first implementation of the circuit architecture with the first group of IP Blocks and a second integration profile for implementing a second implementation of the circuit architecture with the second group of IP Blocks. Steps of determining a first verification profile for verifying the first implementation of the circuit architecture and a second verification profile for verifying the second implementation of the circuit architecture are also performed. The technique also includes the steps of determining a first technical profile for the circuit architecture with the first implementation in response to the architecture profile, to the first design profile, the first integration profile and the first verification profile, and determining a second technical profile for the circuit architecture with the second implementation in response to the architecture profile, the second design profile, the second integration profile and the second verification profile. The step of using the first group of IP Blocks as the group of IP Blocks when the first design profile exceeds the second design profile is then performed. The combination of these steps can provide a method for determining a value of one or more IP blocks.

In a yet further embodiment, engineering-driven EDA tools can be combined with valuation approaches. Web-based portals, ERP systems, and the like can also be included in some embodiments.

Numerous benefits are achieved by way of the present invention over conventional techniques. In many embodiments, the techniques of the present invention are sufficiently robust to account for possible future managerial decisions, i.e. possible future decisions made by management based upon changes in project status, and the like. Further, the technique of the present invention reflects the conditional nature of IP Blocks, i.e. the value of an IP Block depends whether all IP Blocks in the design can be integrated into a circuit, generating a reasonable profit, and the like. This approach also reflects how the terms of one IP Block license are related to design parameters of other required IP Blocks, i.e. net royalties for IP Blocks should be no more than a reasonable amount. Many embodiments are sufficiently robust to accommodate data from subjective inputs, market-based inputs, and mixtures of these types of inputs.

Further, many embodiments according to the present invention are sufficiently robust to allow a user to take into account the option to abandon the project at any time. For example, as events unfold, some design projects become so costly, or are so late to market, that they should be dropped or killed. As another example, market changes may decrease the projected sales for the product, so that the product should be discontinued or abandoned. The method of the present invention also takes into account the option to drop a "bottleneck" IP block. For example, if there are particular features or functionality in a product that are not "required" to be competitive in a particular market place, and these features are causing severe delays in the testing and integration, IP blocks providing those features may be dropped. Embodiments according to the present invention can also take into account the option to switch blocks. For example, if there is a problem with IP Block A during testing and integration, instead of abandoning the project, IP Block B may be used in place of IP Block A to provide the equivalent functionality.

Yet further, many embodiments according to the present invention can consider uncertainties affecting the value of an IP Block including the technical profile risks and the economic profile risks. In many embodiments, risks such as target market segment profile risks, and the like are also considered.

These and other embodiments of the present invention are described in more detail in conjunction with the text below and attached drawings.

BRIEF DESCRIPTION OF THE DRAWINGS

In order to more fully understand the present invention, reference is made to the accompanying drawings. Understanding that these drawings are not to be considered limitations in the scope of the invention, the presently preferred embodiments and the presently understood best mode of the invention are described with additional detail through use of the accompanying drawings in which:

FIG. 10 illustrates a representative example of an embodiment according to the present invention;

DESCRIPTION OF THE SPECIFIC EMBODIMENTS

The present invention is directed to a techniques for selecting and valuing IP Blocks. Select embodiments provide methods enabling users to determine which IP Blocks to incorporate into integrated circuit (IC) designs, which can include a broad range of applications, such as application specific integrated circuit (ASIC) designs, system on chip (SOC) designs, and the like.

Embodiments according to the present invention provide techniques, including systems and methods, for valuing non-financial assets. Non-financial or real assets often include technical or private risk, a source of risk unique to a particular project or firm associated with the real asset. For example, a semiconductor design company is exposed to general semiconductor market conditions (a market risk) but also carries private risk about whether a particular design is delivered to a particular customer on time. Another example of technical risk is the probability that a nuclear power plant will have a performance problem and need to be closed. Analysis can also include market-priced risk, a source of uncertainty that reflects fluctuations in product and stock prices and/or financial contracts, for example. The market-priced risk for a nuclear power plant could be the price of electricity, for example. For further information about market-priced risk, reference may be had to "Real Options: Managing Strategic Investments in an Uncertain World" by Martha Amram and Nalin Kulatilaka, published by Harvard Business School Press, 1999, incorporated herein by reference in its entirety for all purposes.

In exemplary embodiments, methods and systems according to the present invention can account for uncertainties that effect the value and selection of IP blocks. Uncertainty can arise from a multiplicity of sources, such as future decisions made by management, changes in project status, technological change, economic changes and the like. Further, embodiments can include the conditional nature of IP Blocks into the valuation. In these embodiments, the value of an IP Block can reflect whether all IP Blocks in the final circuit can be integrated to generate a reasonable profit, and the like. Embodiments can include techniques that reflect how the terms of one IP Block license are related to other required IP Blocks in the valuation. For example, situations where net royalties for IP Blocks should be no more than a reasonable amount relate IP Block licensing terms to the selection of IP Blocks in a complete project. Many embodiments according to the present invention incorporate valuation techniques employing real option concepts. Further information regarding real option concepts can be found in the text entitled, "Investment Under Uncertainty" by Avinash Dixit and Robert Pindyck, 1994, Princeton University Press, which is incorporated by reference in its entirety for all purposes.

Figure 1:
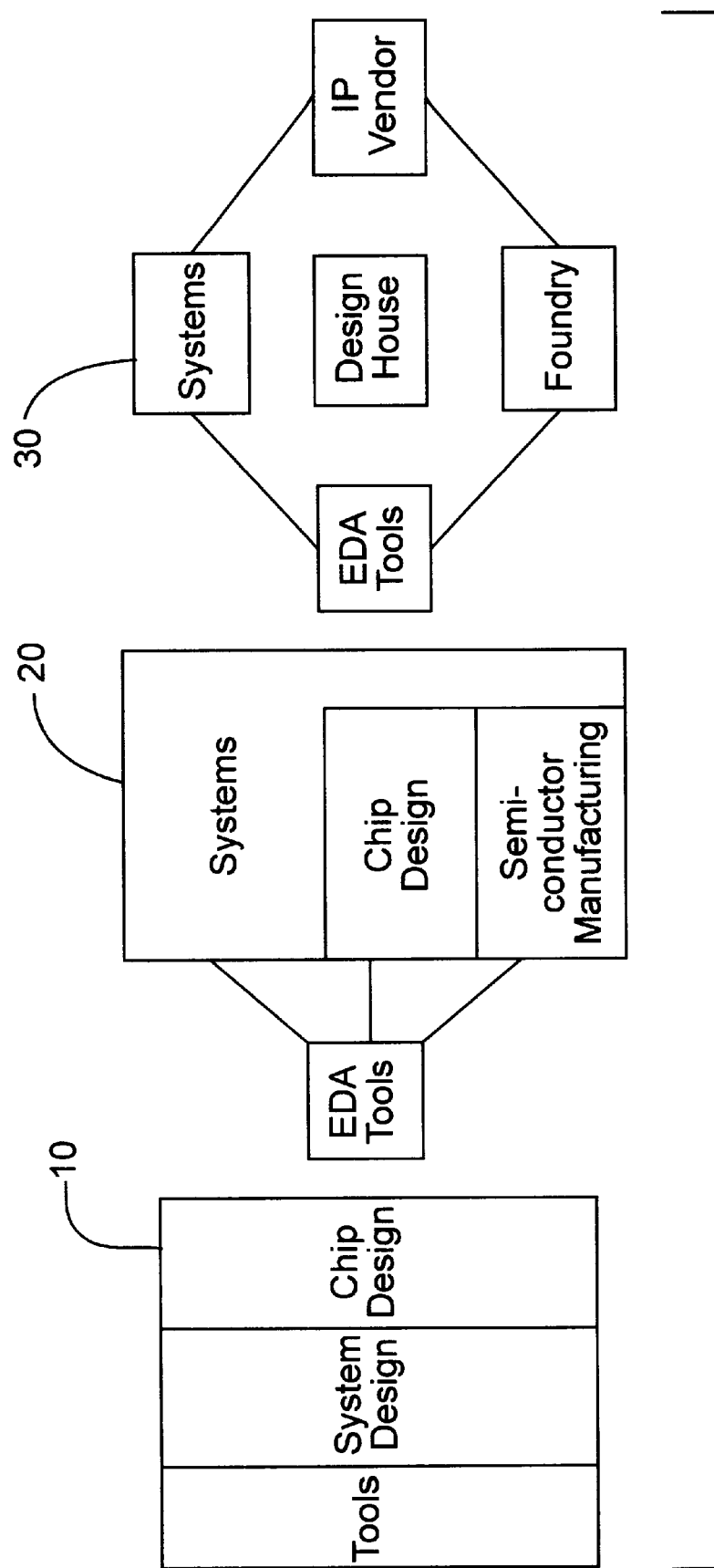
FIG. 1 illustrates disaggregation trends in the electronics industry.
Figure 2:
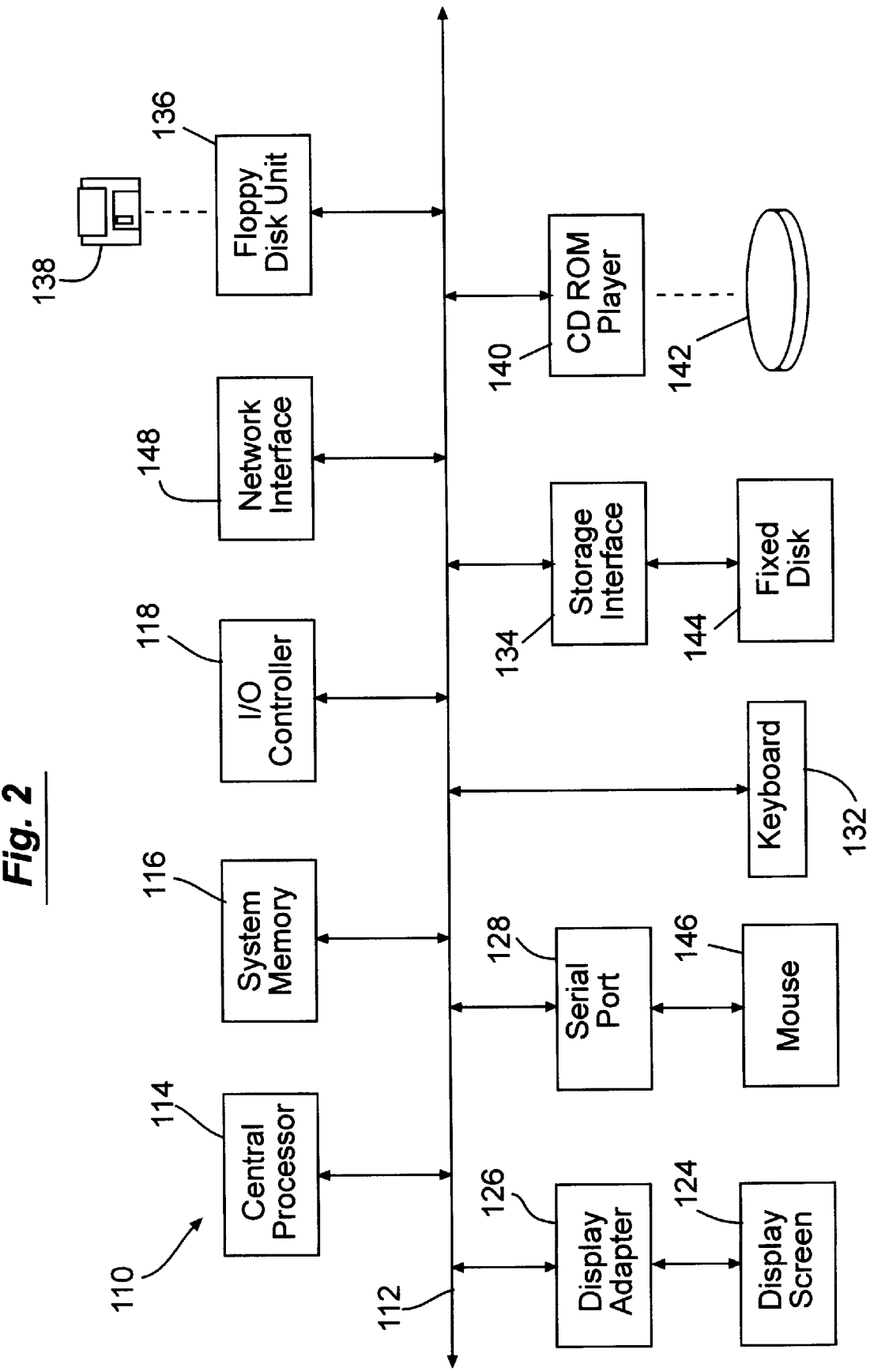
FIG. 2 is a block diagram of a system according to an embodiment according to the present invention.

FIG. 2 depicts a block diagram of a host computer system 110 suitable for implementing the present invention. This diagram is merely an illustration and should not limit the scope of the claims herein. One of ordinary skill in the art would recognize other variations, modifications, and alternatives. Host computer system 110 includes a bus 112 which interconnects major subsystems such as a central processor 114, a system memory 116 (typically RAM), an input/output (I/O) controller 118, an external device such as a display screen 124 via a display adapter 126, a keyboard 132 and a mouse 146 via an I/O controller 118, a SCSI host adapter (not shown), and a floppy disk drive 136 operative to receive a floppy disk 138. Storage Interface 134 may act as a storage interface to a fixed disk drive 144 or a CD-ROM player 140 operative to receive a CD-ROM 142. Fixed disk 144 may be a part of host computer system 110 or may be separate and accessed through other interface systems. A network interface 148 may provide a direct connection to a remote server via a telephone link or to the Internet. Network interface 148 may also connect to a local area network (LAN) or other network interconnecting many computer systems. Many other devices or subsystems (not shown) may be connected in a similar manner. Also, it is not necessary for all of the devices shown in FIG. 2 to be present to practice the present invention, as discussed below. The devices and subsystems may be interconnected in different ways from that shown in FIG. 2. The operation of a computer system such as that shown in FIG. 2 is readily known in the art and is not discussed in detail in this application. Code to implement the present invention, may be operably disposed or stored in computer-readable storage media such as system memory 116, fixed disk 144, CD-ROM 140, or floppy disk 138.

System 110 is merely one example of a configuration that embodies the present invention. It will be readily apparent to one of ordinary skill in the art that many system types, configurations, and combinations of the above devices are suitable for use in light of the present disclosure. Of course, the types of system elements used depend highly upon the application.

Figure 3:
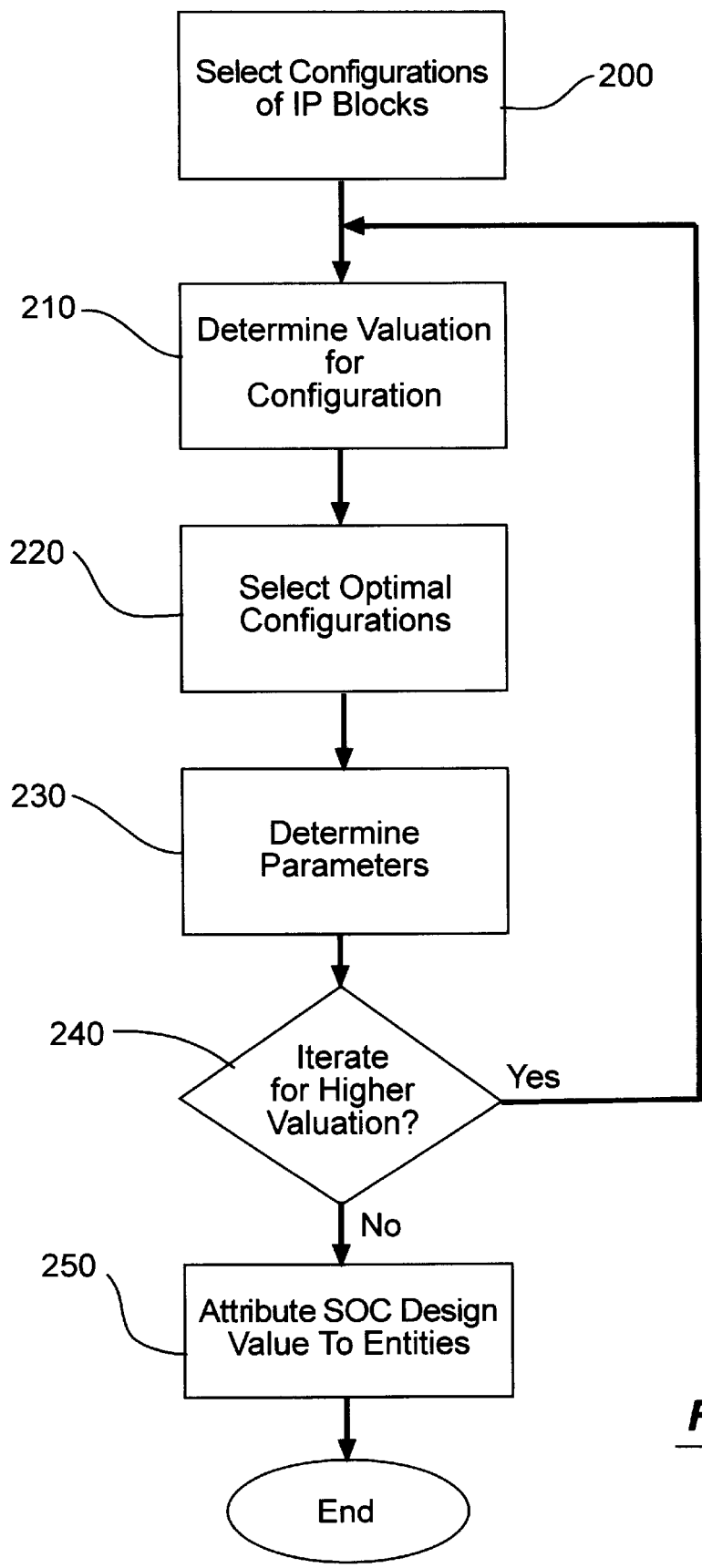
FIG. 3 illustrates a general flow block diagram of an embodiment according to the present invention.

FIG. 3 illustrates a simplified flow block diagram of one particular embodiment according to the present invention. This diagram is merely an illustration and should not limit the scope of the claims herein. One of ordinary skill in the art would recognize other variations, modifications, and alternatives. In a step 200, configurations or groups of IP Blocks that appear to implement the functionality required for the IC or SOC design are selected for analysis. For certain common functions, there are many different sources of IP Blocks and IP Blocks available that provide the functions required, and for certain functions, there are few, if any IP Blocks sources and IP Blocks available. As an example, there are many implementations of functions such as AND gates and OR gates, but fewer implementations of a RISC micro-controller. Because IP Blocks can provide different and overlapping sets of functions, an initial determination about which groups of IP Blocks to analyze is typically required. Thus, the groups of IP Blocks that are selected for analysis typically does not collectively include all possible configurations of IP Blocks that exist, but are a subset of IP Blocks that are likely to fulfill the product requirements. Some embodiments can provide the ability to consider more than one group of IP Blocks. This enables the user to be able to compare "what if?" scenarios. For example, "what if we use an IP Block for the counting function from company A instead of company B?"

Next, in step 210, a valuation for the IP Blocks in the groups of IP Blocks and accordingly, the entire project are determined. In a presently preferable embodiment, a real options based valuation technique can determine the effect on the design value of selecting particular IP Blocks for the design. For both financial options and real options, the Black-Scholes equation can be used to value the option. In its closed form, the Black-Scholes' equation is:

$$C = SN(d_1) - Ee^{-rT}N(d_2)$$

where $d_1 = (\ln(S/E) + (r + \frac{1}{2}\sigma^2)T)/\sigma\sqrt{T}$ $d_2 d_1 - \sigma\sqrt{T}$ This formula expresses the value of the option, C, as a function of the asset price S, option strike price E, expected rate of return of the market r, standard deviation C, number of time periods T and Normal distribution N( ). Features in the option may make other solution methods more suitable. For example, the Black-Scholes equation can be used when an option can be exercised on a pre-specified date. This is known as a European option. However, when an option can be exercised on or before a pre-specified date, this is known as an American option. Many such aspects of options and can be taken into consideration by choice of an appropriate valuation technique or by extensions or modifications to the parameters that define the option. The value of the option can be obtained using mathematical techniques, which include, but are not limited to, analytical approximations, numerical approximations, numerical methods (including, but not limited to, the binomial method) and simulation methods. For many options, a choice of mathematical techniques that will give the correct answer and a decision can be based on personal preference, computational resources, convenience and the like. Embodiments can use any one, or a combination, of a plurality of these techniques or others for determining the value of an option. Further information on the subject of option valuation may be had by reference to Black, F. and M. Scholes (1973) The pricing of options and corporate liabilities, *Journal of Political Economy*, No. 81, pp. 637–659, which is incorporated herein by reference in its entirety for all purposes. Further, embodiments can use other valuation techniques, known to those of ordinary skill in the art, such as discounted cash flow methods, net present value, and the like, or can combine any one of these valuation techniques without departing from the scope of the present invention.

As will be discussed further below, valuation of IP Blocks in step 210 comprises determining effects of certain risks effecting project valuation. For example, embodiments can include valuing risks such as technical feasibility of the project, economic feasibility of the project, target segment access feasibility and the like using a particular group of IP Blocks.

Next, in a step 220, a group or groups of IP Blocks that comprise a particular design are selected, based upon the valuations derived in step 210. Then, in a step 230, parameters are configured to produce an optimal project valuation. In select embodiments, these parameters can include terms and conditions of contracts, licensing agreement terms, transaction costs and the like. Then, in a decisional step 240, a determination is made whether a higher valuation can be achieved by iterating through steps 210–230. If iteration is desired, then steps 210–240 are performed again. Otherwise, in a step 250, a value for the design determined by steps 210–240 is provided and apportioned among IP Block providers.

Figure 4:
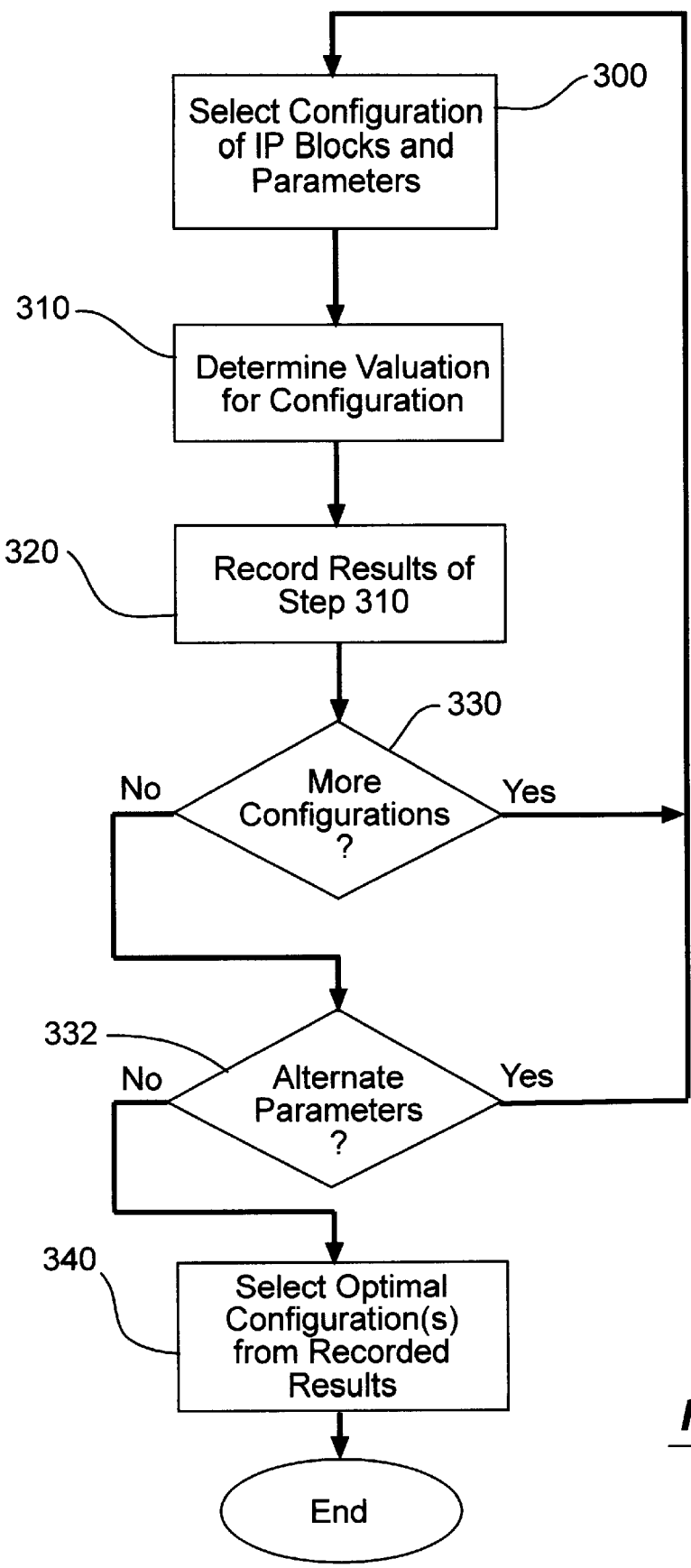
FIG. 4 illustrates a more detailed flow block diagram of an embodiment according to the present invention.

FIG. 4 illustrates a simplified flow block diagram of an alternative embodiment according to the present invention. This diagram is merely an illustration and should not limit the scope of the claims herein. One of ordinary skill in the art would recognize other variations, modifications, and alternatives. In a first step 300, a first configuration is selected from among a plurality of configurations for analysis. A configuration comprises at least one of a plurality of IP Blocks and corresponding transaction parameters. Selection of the first IP Block configuration can be made according to the number of IP Blocks used, or any other criteria.

Next, in a step 310, a valuation for the IP Blocks in the first configuration and the entire project is determined based upon the data for the IP Block. Then, in a step 320, a valuation for each IP Block in the first configuration of IP Blocks and for the entire project is stored.

A decisional step 330 determines if there are other configurations of IP Blocks to analyze. If other configurations can be analyzed, then steps 300 through 320 are repeated for a new configuration. Otherwise, a decisional step 332 determines if there are alternate parameters to analyze using the same configuration. If other parameters can be analyzed, then steps 300 through 332 are repeated for the same configuration but with new parameters. When there are no further configurations nor parameters to analyze, then in step 340, a determination is made as to which configuration will be incorporated into the IC design.

Embodiments according to the present invention can use any of a plurality of different factors in determining the configuration of IP Blocks and parameters. For example, a system integrator can select a configuration that provides a maximum return.

A provider of IP Blocks may select a configuration that provides a greatest licensing revenue. Embodiments can define the optimal configuration in a plurality of different ways. It should be understood that other methods for comparing IP Block configurations, other than that illustrated above are contemplated in alternative embodiments of the present invention.

Figure 5:
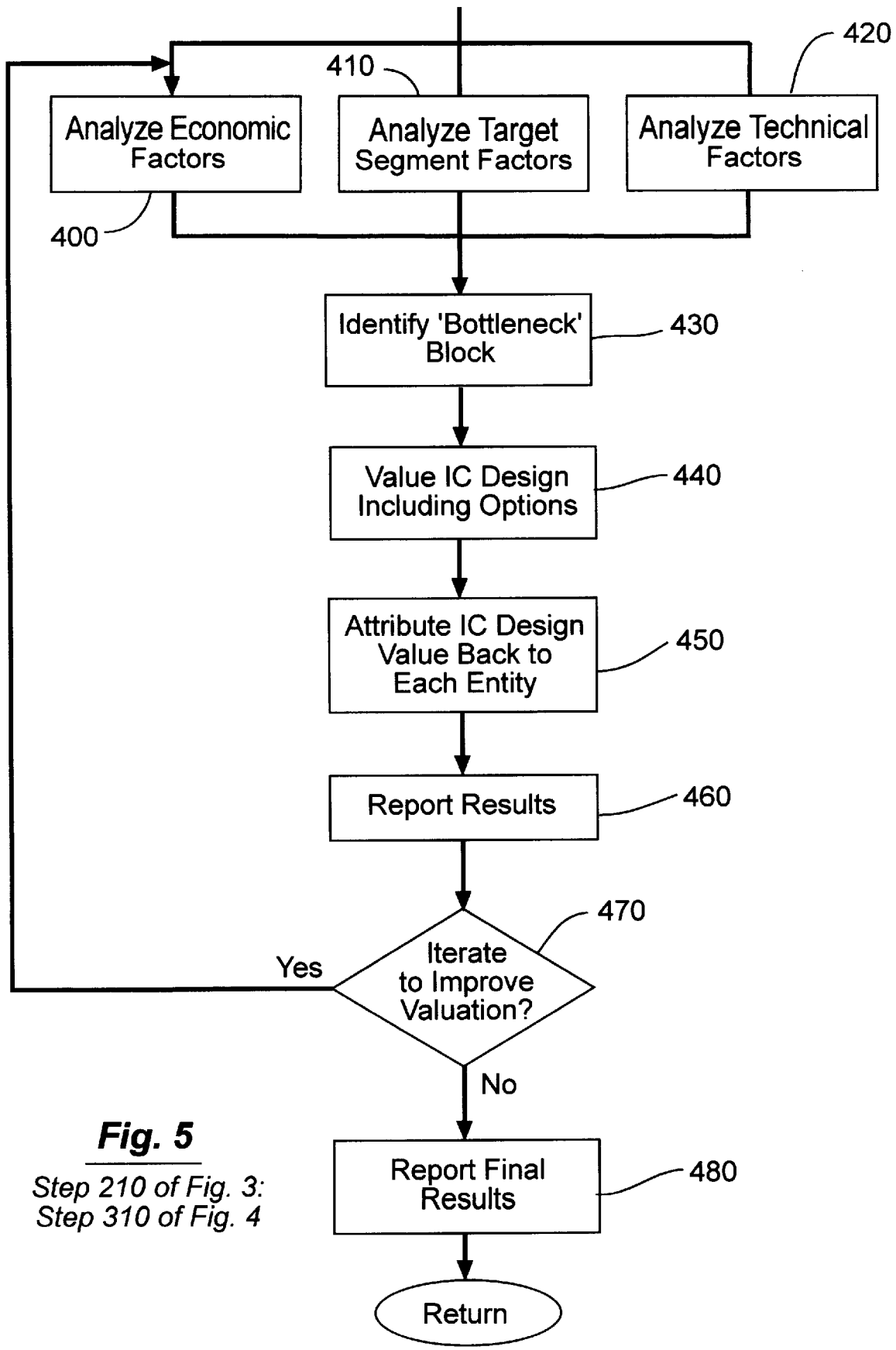
FIG. 5 illustrates a more detailed flow block diagram of an embodiment according to the present invention.

FIG. 5 illustrates a simplified flow block diagram of a representative valuation analysis, such as valuation analysis of step 210 or valuation analysis of step 310 in one particular embodiment according to the present invention. This diagram is merely an illustration and should not limit the scope of the claims herein. One of ordinary skill in the art would recognize other variations, modifications, and alternatives. In one embodiment of the present invention, valuation techniques can be applied to a plurality of factors to obtain a valuation for configurations of IP Blocks as well as the entire project.

The embodiment of FIG. 5 illustrates an economic analysis 400 that evaluates economic factors, a target segment analysis 410 for evaluating target segment factors 410 and technical analysis 420 for evaluating technical factors. The embodiment of FIG. 5 is merely presented as an example; other embodiments can analyze different combinations of factors that can include some, all or none of these particular factors as appropriate to a particular embodiment's application.

In a present embodiment, technical factors can include chip architecture factors, design integration factors, "try and buy" costs for IP blocks, up-front payments from an integrator to an IP block provider, a plurality of support payments by an integrator to an IP block provider, contract terms for payment of royalties from an integrator to an IP block provider, an estimated cost per month for testing and integration of the design; an expected time to complete testing and integration of the IP block with upper and lower bounds, identification of "bottleneck" IP blocks, and the like. Many other technical factors can be incorporated into alternative embodiments without departing from the scope of the present invention.

In a present embodiment, economic factors can include time-to-market factors, financial market characteristics, expected sales at the earliest possible sales date, (including upper and lower bounds), an expected price at the earliest possible sales date, the change in sales profile over time, variable cost of manufacturing, and fixed costs of production, payment schedules between producer (user of the IC) and integrator (manufacturer of the IC) and customer (end-user) and integrator, contractual terms for the payment of royalties between producer and integrator and customer and integrator, configurations of IP Blocks that can be used to build the IC, and the like. Many other economic factors can be incorporated into alternative embodiments without departing from the scope of the present invention.

In a present embodiment, target segment factors can include number of patents in the technology space, identity of companies in the technology space, segment-specific practices such as royalty payment rates, cross-licensing activity, industry experience with patent activity, historical data regarding probabilities of governmental actions that block activity within the target segment, historical data regarding the size of monetary awards for economic damages done to others by activity within the target segment, such as patent infringement awards, property damage awards, regulatory fees, and the like. In many embodiments, these values can be adjusted depending upon size and growth of a market, historical data regarding settlements, and the like. Many other target segment factors can be incorporated into alternative embodiments without departing from the scope of the present invention.

In a particular embodiment, analyses can be performed concurrently, although in alternative embodiments, analyses for the various factors may be calculated sequentially. Analyses can include sources and magnitudes of uncertainty, and the like. Further, embodiments including a subset of factors, such as only technical, or economic and technical, or including a greater number of factors, are contemplated within the scope of the present invention.

Then, in a step 430 a bottleneck block is identified. A bottleneck block is a block that lies within the critical path of the design. The critical path of the design is the projected effort that produces a design at a minimum speed and/or cost. Next, in a step 440 a valuation is determined for an IC design. Step 440 can include determining the effects of factors such as the ability to discontinue a project, delete a bottleneck IP Block in the IC design, switch one or more IP Blocks for a bottleneck IP Block, and the like. Next, in a step 450, IC design values determined by step 440 are apportioned among IP Block providers. Alternatively, in select embodiments, design values can be apportioned among IP Block providers by step 250 in FIG. 3. Then, in a step 460, results are reported. In a decisional step 470 a determination is made whether a higher valuation can be achieved by iterating through steps 400–460. If iteration is desired, then steps 400–460 are performed again. Otherwise, in a step 480, final IC design results are reported.

Figure 6:
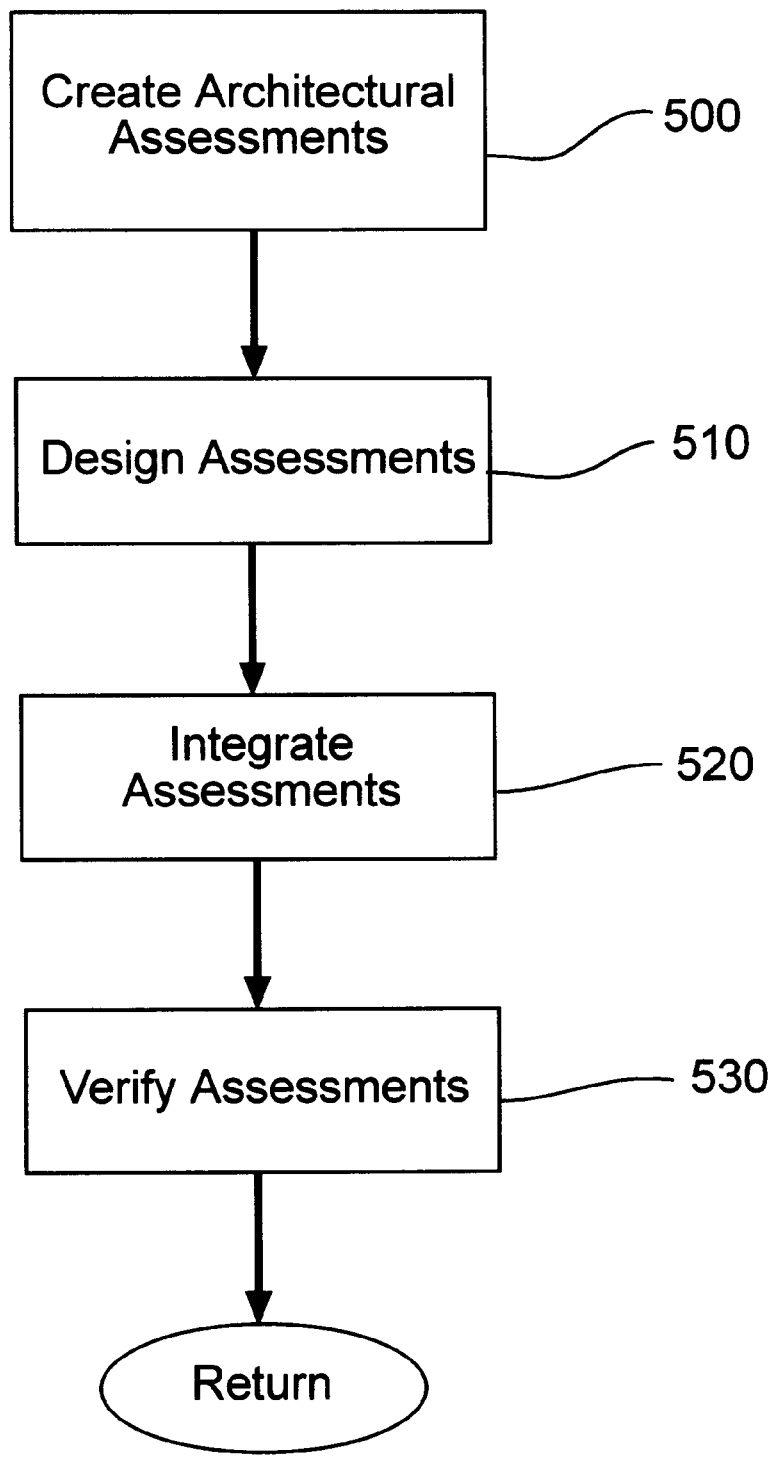
FIG. 6 illustrates a flow block diagram of an embodiment according to the present invention.

FIG. 6 illustrates a simplified flow block diagram of a technical analysis such as technical analysis of step 420 of FIG. 5 in a particular embodiment according to the present invention. This diagram is merely an illustration and should not limit the scope of the claims herein. One of ordinary skill in the art would recognize other variations, modifications, and alternatives. In a step 500, a device architecture comprising a configuration to be fabricated on an IC or SOC is specified and a design profile is determined. Technical analysis comprises analyzing a plurality of critical elements or features in the configuration of the product or product family. Such critical elements are also known as architecture bottlenecks. Based upon the analysis of the critical elements, the process determines an estimate of the amount of time and the resources (typically man-hours) needed to design and integrate the device. These time and resource parameters represent the architecture profile for the design.

In a present embodiment, if a time estimate exceeds a budgeted time frame, an estimated resources are increased, typically reducing the time estimate, until the estimated resources reaches a budgeted resource. Similarly, if a resource estimate exceeds a budgeted resource estimate, estimated time is increased, to reduce the resource estimate, until the estimated time reaches a budgeted time. In a present embodiment, trade-off between time and resources is not necessarily an even or a linear trade-off.

If the budgeted time and budgeted resource cannot both be met, alternative architectures can be identified. Identification of alternatives can include reducing critical elements in the device architecture and repeating the budget comparisons. Alternative embodiments according to the present invention can consider factors other than time and man-hour resources, such as, for example, development costs, facility space and the like.

Next, in step 510, a design profile is determined based upon the architecture determined in step 500. Design profiling of step 510 can comprise analyzing bottlenecks, design limitations and the like in the implementation of a product or product family. Based upon the analysis, an estimate of an amount of time and resources (typically man-hours) are needed to design an implementation of the architecture and to integrate (execute) this design can be determined. These time and resource parameters represent a design profile for the design. Select embodiments also perform a check to determine if the time estimate exceeds a budgeted time frame. If the time estimate exceeds a budget, estimated resources are increased until a budgeted resource is reached. Similarly, the resource estimate is also clipped to a constraint, and the time estimate adjusted if required. If the budgeted time and budgeted resource cannot both be met, alternative design implementations using available IP Blocks can be identified. Many embodiments according to the present invention can consider factors other than time and man-hour resources, such as, for example logic complexity.

Next, in step 520, an integration profile is determined based upon the implementation with specific IP Blocks determined in steps 500 and 510. This process typically analyzes important components in the integration (execution) of the design implementation. Similar to the valuation described with reference to step 510, an estimate of an amount of time and an estimate of resources needed to integrate the design implementation can be determined. Trade-offs can be attempted between the amount of time and resources to keep time and resources needed under budgeted values. If the budgeted time and budgeted resources cannot both be met, alternative topologies using available IP Blocks can be identified. Many embodiments according to the present invention can consider factors other than time and man-hour resources, such as, for example chip die size.

Next, in step 530, a verification profile is determined based upon the circuit integration with specific IP Blocks determined by steps 500–520. This process can analyze the important elements involved in the verification of the design integration. Similar to the valuation described with reference to steps 510 and 520, an estimate of an amount of time and an estimate of resources needed to verify the integrated implementation can be determined. Trade-offs can be attempted between the amount of time and resources to keep the time and resources need under budgeted values. If the budgeted time and budgeted resources cannot both be met, alternative design implementations using available IP Blocks can be identified that meet the budgets. Such a process typically includes using different IP Blocks that are available for the integration, implementation, or architecture, and repeating the budget comparisons.

Many embodiments according to the present invention can consider factors other than time and man-hour resources, for example verification duration.

Figure 7A:
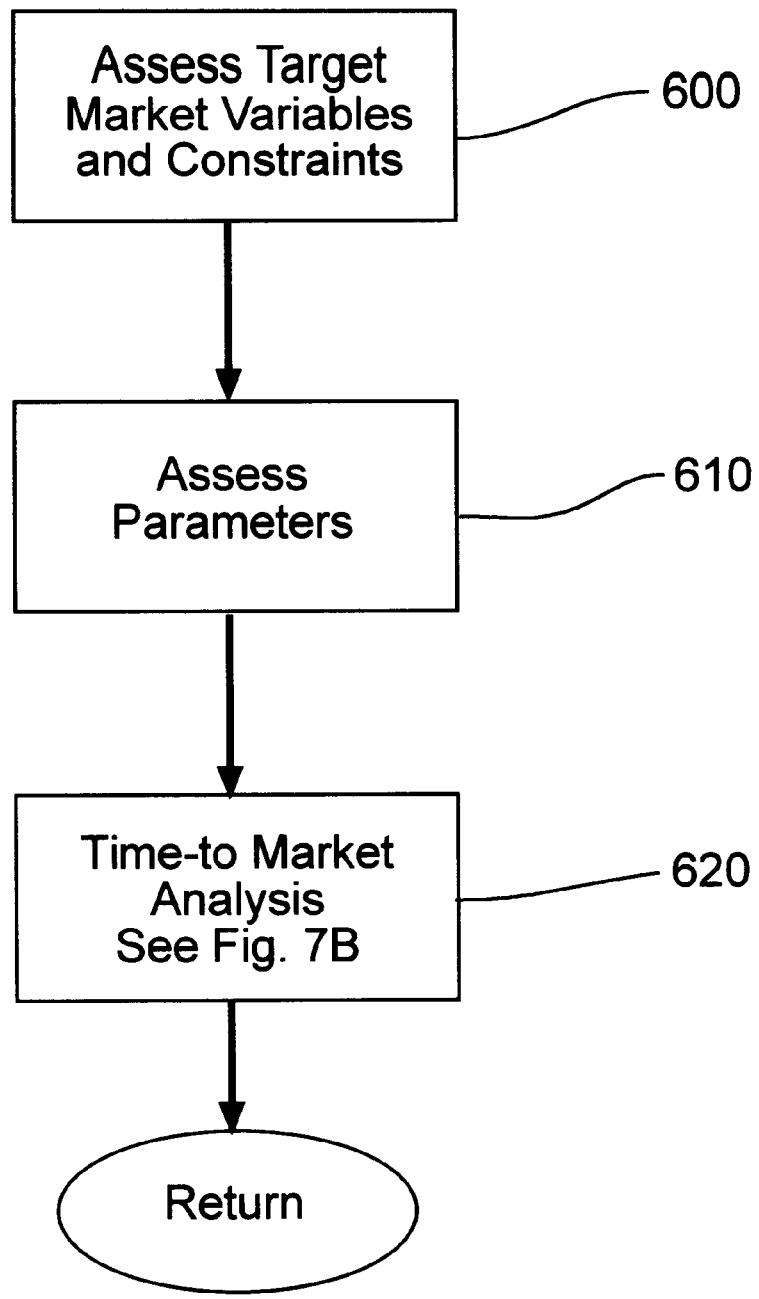
FIGS. 7A–7B illustrate flow block diagram of an embodiment according to the present invention.
Figure 7B:
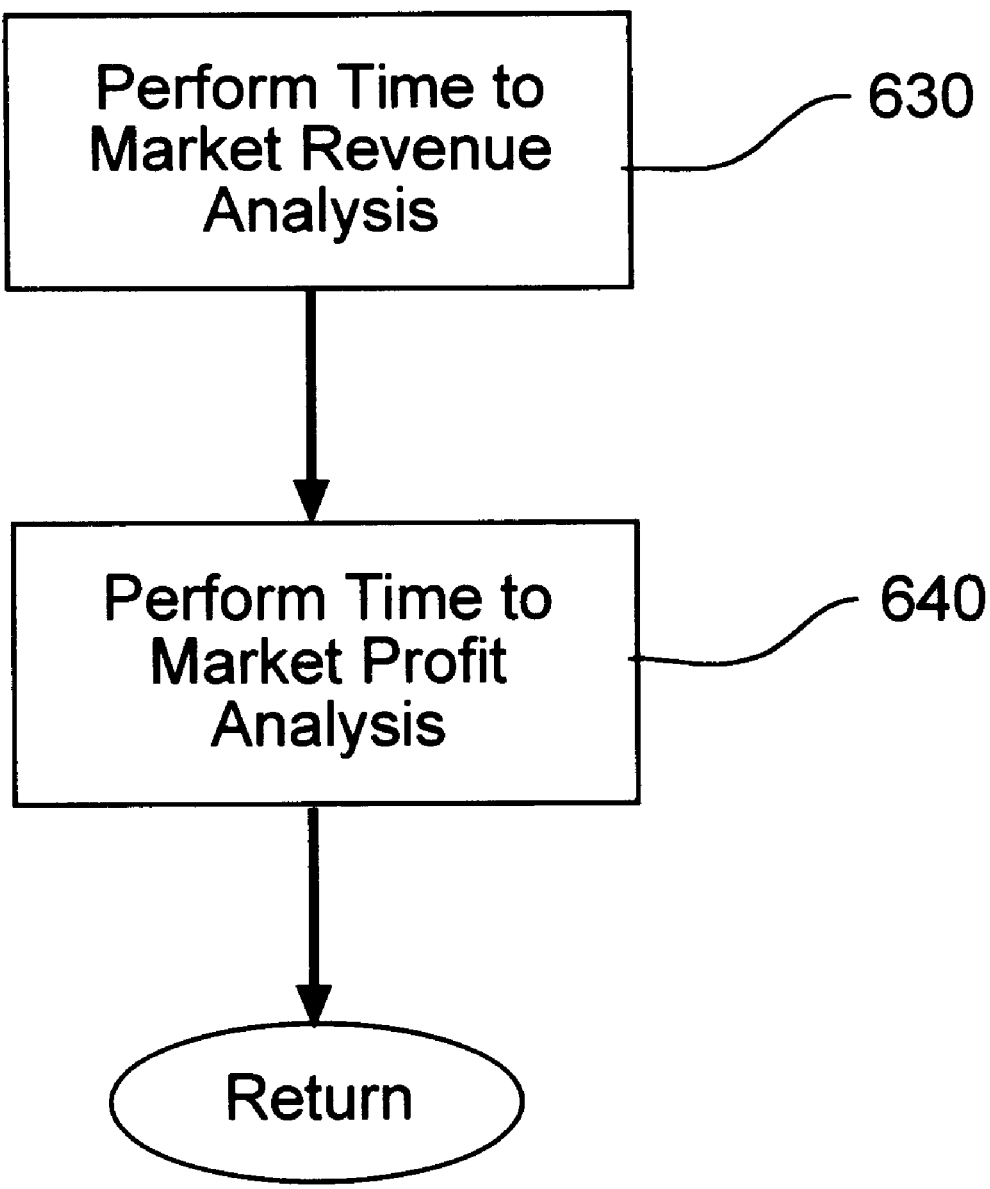

FIGS. 7A–7B illustrate simplified flow block diagrams of an economic profile analysis, such as that of step 400 of FIG. 5 in a particular embodiment according to the present invention. These diagrams are merely an illustration and should not limit the scope of the claims herein. One of ordinary skill in the art would recognize other variations, modifications, and alternatives. In a step 600, depending upon the group of IP Blocks selected, licensing terms and a licensing valuation are determined. This step comprises analyses of transactional terms available for the IP Blocks of interest.

In a present embodiment, step 600 comprises licensing models such as front-end loaded (up-front lump sum payment), back-end loaded (on-going royalty stream), a hybrid of the front and back-end scheme, and the like. Embodiments can comprise other licensing or transactional models without departing from the scope of the present invention. A value can be determined based upon factors such as terms and conditions of licensing agreements, projected and target market share, and the like.

Next, in step 610, a target market valuation is determined for the product including the IC based upon determinations of market conditions, that can comprise factors that exist or can exist when a product is brought to market. In one present embodiment, market factors can include a market size in terms of number of units and/or revenue, a number and type of competitors in the targeted market, features offered on competing products, a projected market growth, and the like. Depending upon the IP Blocks incorporated into the product, the functionality and features of the product can change. Thus, a target market valuation, which can be a dollar amount, can depend upon which IP Blocks have been included into a project or a product.

Next, in step 620, a time-to-market analysis can be performed. Time to market analyses can determine profit and revenues in relation to time. In a particular embodiment according to the present invention, time to market analysis accounts for a products strong common pattern of sales. Time to market analysis can comprise determining from a input features, such as an externally driven start date of the market (such as Christmas selling season), a pattern of increasing sales which slowly reach a peak or plateau and then decline, a pattern of greater profit margins at the beginning of the sales cycle, and then decreasing throughout opportunities to sell a follow-on product that may overlap with the latter stages of the first product, and the like. Time-to-market analyses can be based upon the sales and profit patterns described above can comprise lost sales and profits per month of delay estimate of the size of the potential market by summing and/or discounting monthly sales, estimate of the value of the potential market by summing and/or discounting back to present monthly profits, and the like. Variants of time-to-market analyses include refinement of the profile of sales and profits over time, analyses by product category or segment and so on. Time-to-market analysis principles are discussed in greater detail with reference to FIG. 13. For further information about time to market analysis, reference may be had to *Kmet's Korner*, by Ron Kmetovicz, of Time to Market Associates, P.O. Box 160571, Cupertino, Calif. 95016, published in Electronic Design, incorporated herein by reference in its entirety for all purposes. Steps 630–640 of FIG. 7B illustrate component processes in a particular embodiment of a time to market analysis. Other methods for calculating time-to-market costs are contemplated in alternative embodiments without departing from the scope of the present invention.

FIG. 7B illustrates a simplified flow block diagram of a revenue time to market analysis, such as time to market analysis of step 620 of FIG. 7A in a particular embodiment according to the present invention. This diagram is merely an illustration and should not limit the scope of the claims herein. One of ordinary skill in the art would recognize other variations, modifications, and alternatives. In step 630, a time to market revenue analysis with regards to time is performed. This step typically quantifies time-to-market value with regards to the market impact and product revenue. For example, if a product is a month early, revenues can increase by a particular amount, or if a product is two months late revenues can decrease by a specific amount, or the like. Reference may be had to the publication by Ron Kmetovicz, of Time to Market Associates, P.O. Box 160571, Cupertino, Calif. 95016, in Electronic Design column, *Kmet's Korner*, for further reference about time to market revenue analyses.

Next, in a step 640, a time to market profit analysis with regards to time is performed. Embodiments can comprise techniques for quantifying time-to-market value with regards to product profits. For example, if a product is a month early, profits can increase by a particular amount, or if a product is two months late, profits can decrease by a specific amount, or the like. Reference may be had to the publication by Ron Kmetovicz, of Time to Market Associates, P.O. Box 160571, Cupertino, Calif. 95016, in Electronic Design column, *Kmet's Korner*, for further reference about time to market revenue analyses.

Figure 8:
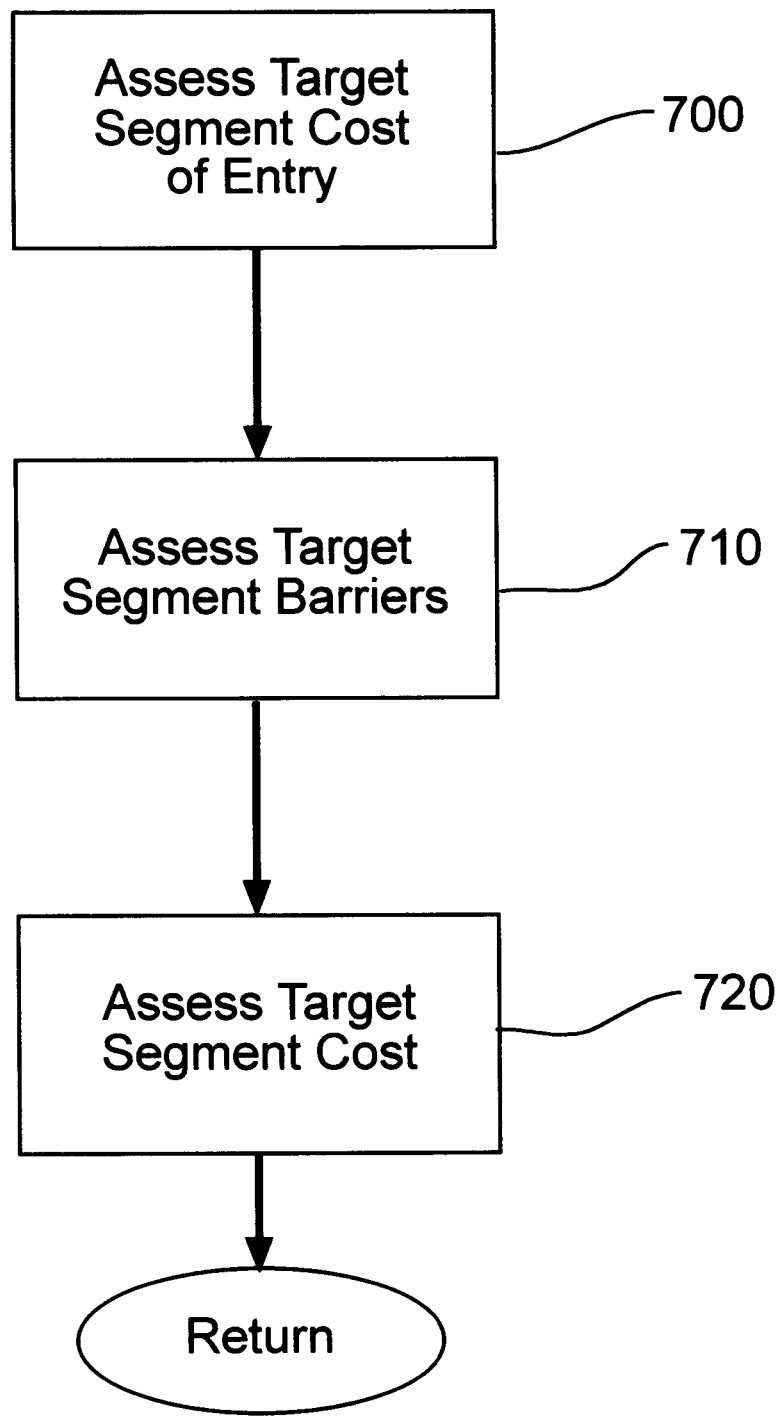
FIG. 8 illustrates a flow block diagram of an embodiment according to the present invention.

FIG. 8 illustrate simplified flow block diagrams of a target segment profile analysis, such as that of step 410 of FIG. 5 in an embodiment of the present invention. This diagram is merely an illustration and should not limit the scope of the claims herein. One of ordinary skill in the art would recognize other variations, modifications, and alternatives. FIG. 8 illustrates a step 700, wherein a target segment cost of entry valuation is determined. Costs of entering a target segment and the market can arise from actions by governmental, regulatory bodies, competitors, and the like. By way of illustrative example and not as a limitation, a court ordered award of damages is one instance of a target segment cost of entry. In step 700, an analysis is determined based upon factors comprising a probability of a fee being imposed on entering a target market segment for a product comprising IP Blocks of interest. In a present embodiment, a probability of a cost of entry for a target market segment is derived from statistical factors representative of industry classes or segments. Statistical factors can be derived from a plurality of sources without departing from the scope of the present invention, such as relevant historical data from decisions of courts, regulatory agencies, administrative bodies, and the like.

Next, in a step 710, a target segment entry barrier analysis is determined.

A target segment barrier models situations where entry into, or continuation in, a target segment of the market is completely barred. Such situations can arise from governmental, regulatory, competitor actions and the like. By way of illustrative example and not as a limitation, a court ordered injunction can be one instance of a target segment barrier. A probability is determined for a target segment barrier to a product comprising IP Blocks. In a present embodiment, a probability of a target market segment barrier can also be derived from statistical factors for representative industry classes or segments.

Next, in a step 720, a target segment cost analysis is determined. A target segment cost reflects a probability of causing economic damages. Target segment cost can comprise payments of lost profits, lost wages, compensatory damages and the like because of government, regulatory or competitor actions. In a present embodiment, a target product segment economic damage valuation can be derived from statistical factors for representative industry classes or segments.

EXAMPLE

Figure 9A:
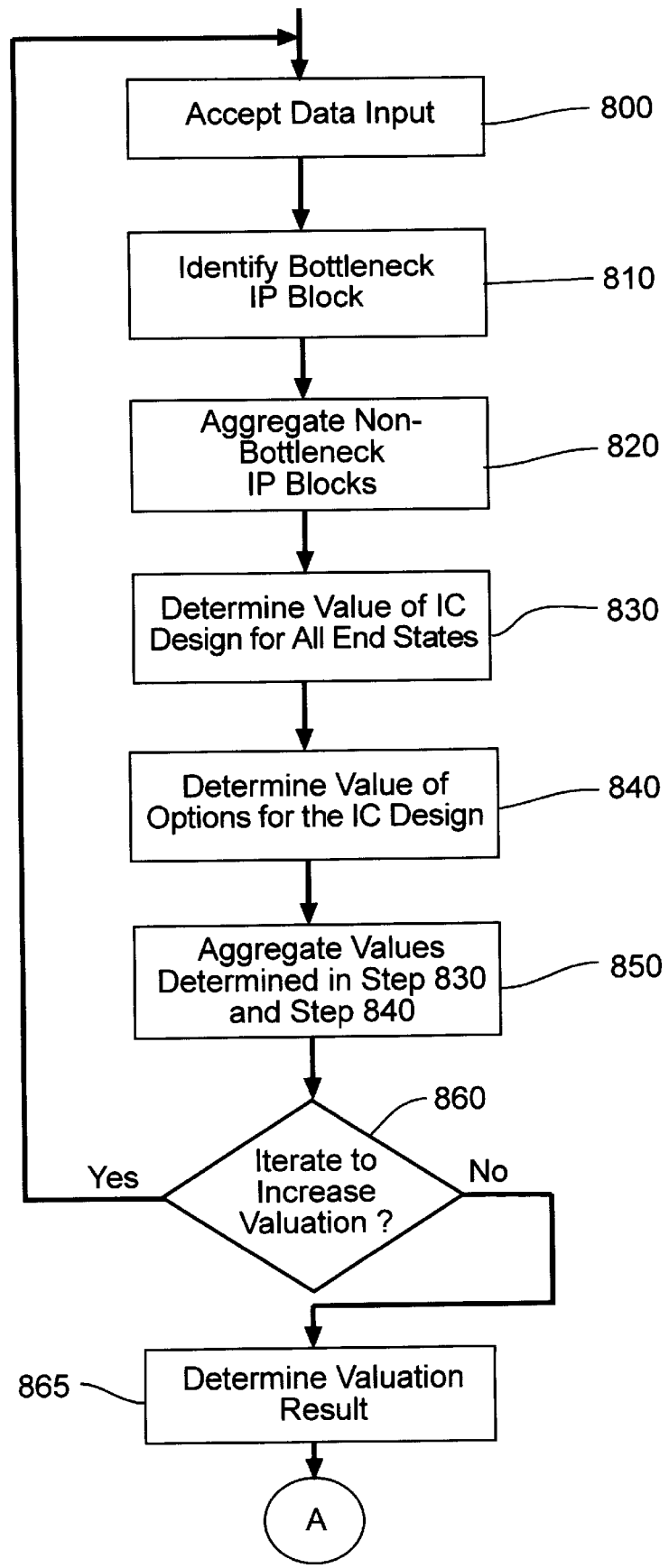
FIGS. 9A–9B illustrate flow block diagram of an embodiment according to the present invention.
Figure 9B:
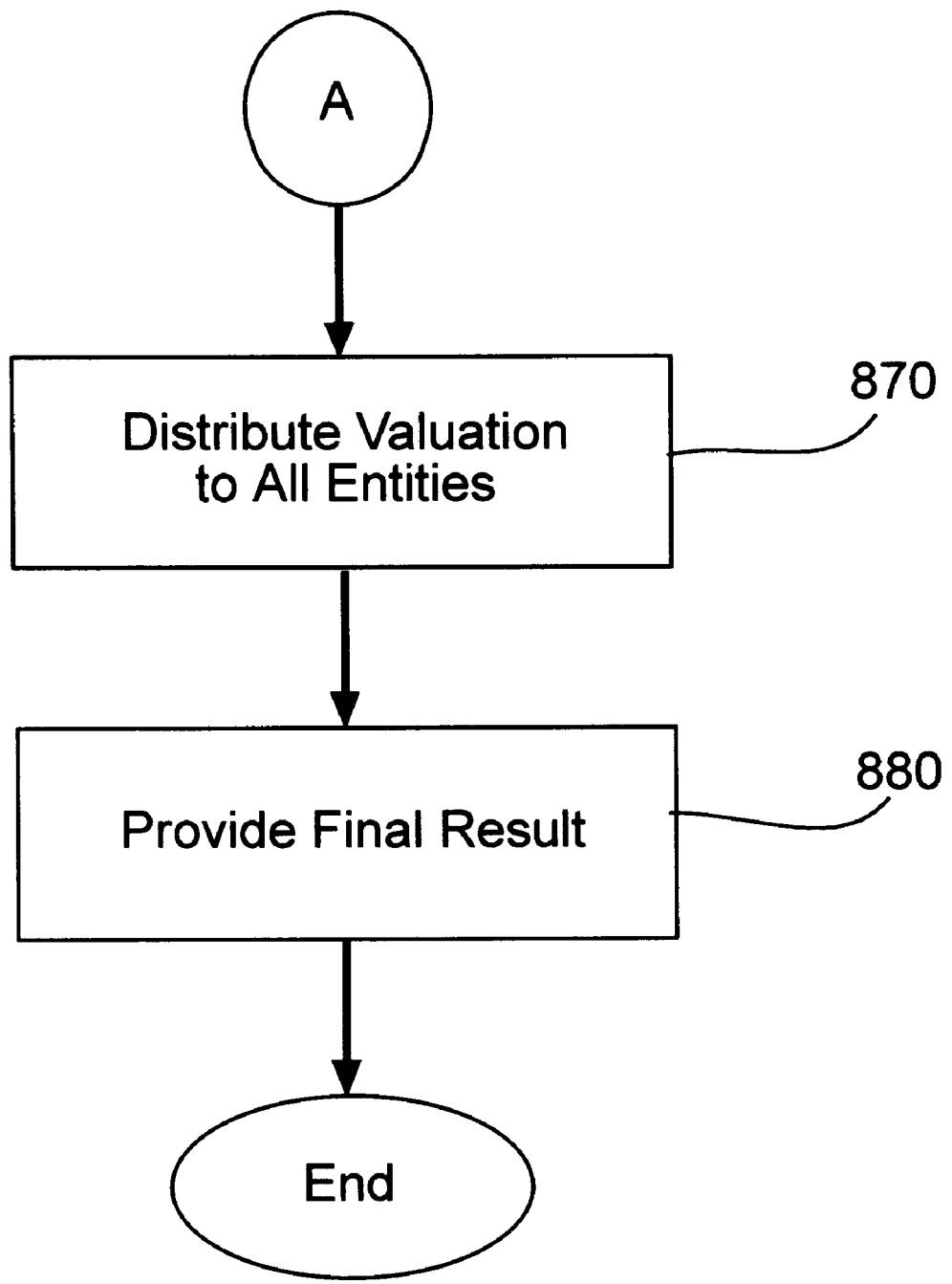

FIGS. 9A and 9B illustrate flow diagrams of an example of IP Block selection as illustrated in FIG. 10 according to the present invention. These diagrams are merely illustrations and should not limit the scope of the claims herein. One of ordinary skill in the art would recognize other variations, modifications, and alternatives.

In a step 800 in FIG. 9A, IP Blocks are determined and data relating to technical, economic, and target market factors are accepted as input. In the example illustrated in FIG. 10, there is one SOC integrator I; one user of the SOC, producer P; and three IP blocks BP1, 904, BP2, 902, and BP3, 908, provided by IP providers. The starting configuration (known as the original configuration) includes blocks BP1 and BP2. The first block, BP1, represents an aggregation of non-discretionary blocks, and dropping this block means effectively killing the project. BP2 represents the bottleneck block, which is initially selected by the producer/integrator. BP3 represents the alternative to the bottleneck block. In some cases where the cost of BP2 becomes too high, it may be desirable for the producer and/or integrator to replace block BP2 with BP3.

Input data for the IP Blocks can comprise technical data factors such as "try and buy" costs; up-front payments from an integrator to an IP block provider; a plurality of support payments by an integrator to an IP block provider; contract terms for payment of royalties from an integrator to an IP block provider, an estimated cost per month for testing and integration of the design; an expected time to complete testing and integration of the IP block with upper and lower bounds, identification of "bottleneck" IP blocks, and the like. Many other factors can be incorporated into alternative embodiments without departing from the scope of the present invention.

In the example of FIGS. 9A–9B and FIG. 10, a technical factor of the cost of testing and integrating IP blocks, such as IP Blocks BP1, BP2 and BP3 can be expressed as the change in the remaining cost of testing and integration of the block as a function of measured and estimated technical factors determined in step 420 of FIG. 5, for example.

In the present embodiment, the cost of completing testing and integration of any one IP block is independent of completing any other IP block.

In a present embodiment, market or economic factors can comprise an expected sales at the earliest possible sales date, (including upper and lower bounds); an expected price at the earliest possible sales date; the change in sales profile over time; variable cost of manufacturing; and fixed costs of production. Other types of data are envisioned in alternative embodiments according to the present invention.

Other economic factors can comprise payment schedules between producer (user of the SOC) and integrator (manufacturer of the SOC) and customer (end-user) and integrator; contractual terms for the payment of royalties between producer and integrator and customer and integrator; and a list of configurations of IP Blocks that can be used to build the SOC. In alternative embodiments, other factors can also be incorporated into the invention.

In a present embodiment, target market or segment factors can include historical data regarding probabilities of governmental actions that block activity within the target segment, historical data regarding the size of monetary awards for economic damages done to others by activity within the target segment, such as patent infringement awards, property damage awards, regulatory fees, and the like. In many embodiments, these values can be adjusted depending upon size and growth of a market, historical data regarding settlements, and the like.

To account for target segment risk factors, for each IP block there is a chance each period of an injunction or preliminary injunction that would drive project value to zero. This probability exists during the testing and integration phase and during the sales phase. One way to interpret this is to say that there is a certain percent chance of an injunction per year.

During the sales phase there is also a certain chance of incurring a charge due to infringement of patents. One way to interpret this is to say that the expected infringement cost per year of sales is X, and that the expected infringement cost during n years of sales is nX.

Next, in a step 810, a bottleneck IP block is identified. A bottleneck IP Block is one which cannot be eliminated from a design. In the example illustrated by FIG. 10, bottleneck block BP2 is initially selected by the designer.

Then, in a step 820, non-bottleneck blocks are aggregated into a meta-block, such as meta-block BP1, 904 in FIG. 10, to simplify analysis. An alternative to bottleneck block BP2, is then identified as IP Block BP3, 906 in FIG. 10. Switch IP Block 908 in FIG. 10 indicates BP3, 906 is an alternative to BP2, 902. Combinations of blocks from BP1, BP2, and BP3 are identifiable potential SOC solutions, as denoted by end state icons 908, 910, 912, 913, 914, 916 and 918 in FIG. 10. For example, solutions can comprise blocks from BP1 and BP2, denoted as SOC design A, 920 in FIG. 10; BP1 and BP3, denoted as SOC design B, 922 in FIG. 10; and BP1, as indicated by drop block 913 in SOC design A 920 in FIG. 10.

Next, in a step 830, a valuation is determined for each potential SOC design determined in step 830. This valuation can be determined using a net present value (NPV) method, taking into account economic factors, as described above for the SOC integrator, a product producer (the SOC consumer), and for the respective IP blocks BP1, BP2, and BP3. As discussed above, in a present embodiment, a time to market analysis can be performed to estimate the costs of entering a market at different time periods.

In the example of FIGS. 9A–9B and FIG. 10, the producer bases all decisions on the forecasted sales. This means that testing and integration costs are irrelevant to the producer. This is because the costs of testing and integration fall on the SOC integrator. The producer's incentive to continue with or drop a block is determined by the sales lost if too much time is spent testing a difficult block.

In this example, once the testing and integration of the SOC is completed, two sales cycles begin. Based on a fixed price and the point in the sales cycle at which the chip is completed, profits are allocated to the producer, integrator, and the three block providers based on contractual provisions such as royalties and up-front payments.

The options that are available to the producer include, canceling block BP2 and completing an SOC design with only block BP1. This decision decreases the value of the SOC by an amount determined by the producer. Another option is to switch from block BP2 to block BP3. This action may reduce or enhance the ultimate chip value.

Another option is to cancel entire project. For each of these blocks, three cash flow streams and net present values (NPV's) are calculated. The first assumes that blocks BP1 and BP2 are successfully incorporated into the chip. The second assumes that blocks BP1 and BP3 are successfully incorporated into the chip. The third assumes that block BP2 or BP3 is dropped from the chip and that only block BP1 is in the chip.

Figure 11:
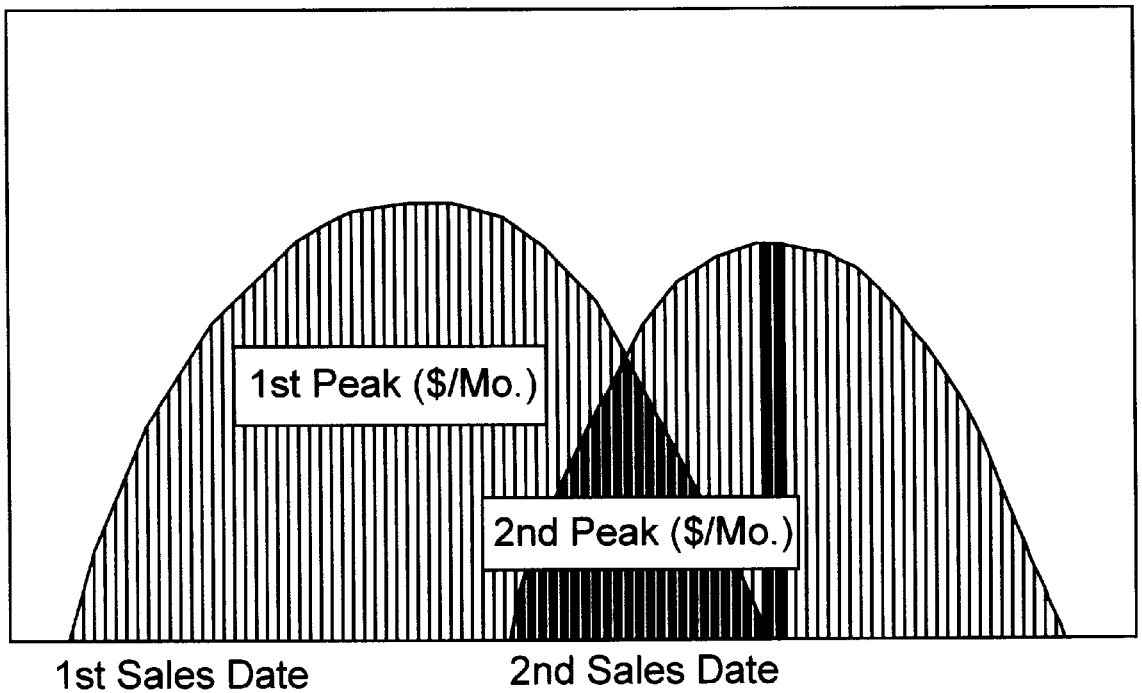
FIG. 11 illustrates a representative time to market example of an embodiment according to the present invention.

FIG. 11 illustrates two sales cycles in the example of FIGS. 9A–9B in an embodiment according to the present invention. This diagram is merely an illustration and should not limit the scope of the claims herein. One of ordinary skill in the art would recognize other variations, modifications, and alternatives. These sales cycles are assumed to be parabola-shaped. However, other types of relationships can also be used without departing from the scope of the present invention. The sales cycles represent sales of products according to time-to-market principles disclosed above. The left most sales cycle assumes the product is completed before a target date "t" whereas the right most sales cycle assumes the product is completed after the target date t. Given that the producer is primarily concerned about time-to-market, the following producer data must be entered for the producer including fixed costs, gross margin, total royalties owed to the integrator and block providers, and the like.

In the case when the SOC is completed before time t, the cash flows for the producer at time t can be expressed in terms of the gross margin as a percent of sales (MAR), the royalties as a percent of revenue payable by the producer to the integrator and IP block providers (ROY), the fixed costs (FE). These relationships can be calculated for cases where: 1) blocks BP1 and BP2 are used; 2) blocks BP1 and BP3 are used; and 3) block BP1 is used, respectively.

As illustrated in FIG. 11, each sales cycle can be defined by the user through parameters of a start date, months to peak and the sales peak by input data to the system. Based on these inputs, the time duration and cash flows can be calculated. The cash flows for the integrator and the block providers can be expressed in terms of these cash flow and time parameters.

The cash flows determined above for the producer and integrator are adjusted to account for the probability of injunction, infringement and the time value of money, to produce the net present value (NPV) for the producer and the integrator for each of the IP Blocks. These NPV values can be used as boundary conditions for the real options analysis. In a presently preferable embodiment according to the present invention, NPVs are calculated using Simpson's Rule. However, one of ordinary skill in the art would recognize many alternative methods for determining the NPV of such cash flows.

In a step 840, a valuation can be determined for an entire project by determining values for possible outcomes of different "cases" and reflecting back that values to previous time periods. These cases incorporate as options, the decisions of a producer who bases all decisions on forecasted sales. This means that testing and integration costs are irrelevant to this particular producer since these costs fall on the SOC integrator. The producer's incentive to continue with or drop a block is determined only by the sales lost if too much time is spent testing a difficult block. The options that are available to the producer include, canceling block BP2 and completing an SOC design with only block BP1. This decision decreases the value of the SOC by an amount determined by the producer. Another option is to switch from block BP2 to block BP3. This action may reduce or enhance the ultimate chip value. Another option is to cancel entire project.

In the example of FIGS. 9A–9B and FIG. 10, dynamic programming techniques known in the art are used to evaluate the outcomes of decisions that can be made about the IP Blocks. In this example, numerous economic agents and numerous options are presented, making it preferable to use a plurality of relationships to describe the system. Relationships express the discounted time value of the project to the expected value of the SOC project as a continuously time varying function of the time t, with investment $K_1$ for testing and integrating block BP1 and $K_2$ for testing and integrating block BP2. The discounted time value of the project is also affected by one or more payments, such as payments made at contractual milestones, up-front payments made between the participating parties, and the like. In a presently preferable embodiment, there are up-front payments to the IP block providers and up-front payments and milestone payments to the integrator. In other embodiments, other payments between the parties can be provided for.

In a presently preferable embodiment, the relationship between the discounted time value of the project and the above mentioned factors is provided using Bellman equations, known to those of ordinary skill in the art. A Bellman equation, also known as the fundamental equation of optimality, is a mathematical expression used to make an optimal decision or policy. Such equations can be used to weigh the benefits of immediate action against the benefits of continuation. See Dixit and Pindyck (1994) pages 99–101.

In a present embodiment, a first case "A" accounts for the situation where only blocks BP1 remains in the design, and blocks BP2 and BP3 are dropped, as indicated by drop IP block outcome 913 in SOC Design A 920 in FIG. 10. In a second case "D", block BP3 has been completed (tested and integrated), and block BP1 remains to be completed. Case D valuations are then calculated. A third case "B" can be considered, where block BP1 has been completed (tested and integrated), and block BP3 remains to be completed. Using results from valuing case "A" for option and boundary values, valuations for case "B" can be calculated. A fourth case "F" can be considered, where both blocks BP1 and BP3 remain to be completed. Using results from cases "A", "B", and "D" for option values and boundary values, a valuation for case "F" can be calculated. A fifth case "C" can be considered, where block BP1 has been completed (tested and integrated), and block BP2 remains to be completed. Valuations for case "C" can be calculated. A sixth case "E" can be considered, where block BP2 has been completed (tested and integrated), and block BP1 remains to be completed. Valuation for case "E" can be calculated. A seventh case "G" can be considered, where both blocks BP1 and BP2 remain to be completed. Using results from cases "A", "C", "E" and "F" for option values and boundary values, valuations for case "G" can be calculated.

Case A

In case A, block BP1 remains, and blocks BP2 and BP3 have previously been dropped. A value of the project when there is only this block left to integrate is determined. The only option to any party is the option to cancel the project. An indicator function is defined to equal "Continue" if the producer continues and "Cancel" if the producer cancels the project. The producer decides if the project continues based on the maximization term in the above condition. The producer continues if the value of continuation (with block BP1 alone) exceeds the value of immediate abandonment.

Case B

In case B, block BP3 remains and block BP1 has been completed. A value of the project is then defined when there is only this block left to integrate. Still remaining are the options to drop block BP3 and to cancel the project. In this embodiment, the producer decides if the project continues based on maximization of the value of the project. An indicator function is defined to equals "Continue" if the producer continues, "Cancel" if the producer cancels the project, and "Drop" if the producer drops block BP3. The producer makes the drop and continuation decisions simultaneously, choosing the highest valued of three alternatives: 1) continue and drop block BP3 (BP1 is complete, so the design is complete); 2) continue and keep block BP3 in the design (integrate BP3, BP1 complete); or 3) cancel the project.

Case C

In case C, block BP2 remains and block BP1 has been finished. A value of the project is defined when there is only one block left to integrate. Still remaining at this point are the options to switch to block BP3, drop block BP2, or to cancel the project. If the producer decides whether the project continues based maximization of the value of the project. An indicator function is defined to equal "Continue" if the producer continues, "Cancel" if the producer cancels the project, "Drop" if the producer drops block BP2, and "Switch" if the producer switches to block BP3. The producer makes the drop, continuation, and switch decisions simultaneously, choosing the highest valued of 4 alternatives: 1) continue and drop block BP2 (the design is complete because BP1 is complete); 2) continue and keep block BP2 in the design (integrate BP2, BP1 is complete); 3) continue and switch block BP3 for BP2 (integrate BP3, BP1 is complete); or 4) cancel the project.

Case D

In case D, block BP1 remains, BP2 has been dropped, and BP3 has already been completed. A value of the project when there is only one block left to integrate is defined. The remaining option is to cancel the project. It is not feasible to drop block BP1, since the value of the project will fall to zero. In this embodiment, the producer decides whether the project continues based on maximization of the value of the project. An indicator function is defined to equal "Continue" if the producer continues and "Cancel" if the producer cancels the project. The producer continues if the value of continuation (with BP1 in the process of integration and BP3 complete) exceeds the value of immediate abandonment.

Case E

In case E, block BP1 remains and BP2 has been completed. A value for the project is then defined when there is only one block, BP1, left to integrate. The remaining option is to cancel the project. It is not feasible to drop block BP1, since the value of the project is assumed to fall to zero. In the present embodiment the producer decides whether the project continues based on the maximization term in the above condition. An indicator function is defined to equal "Continue" if the producer continues and "Cancel" if the producer cancels the project. The producer continues if the value of continuation (with BP1 in the process of integration and BP2 complete) exceeds the value of immediate abandonment.

Case F

Case F is a three-dimensional case in which blocks BP1 and BP3 are being integrated into the chip. A value is defined for the project when there are two blocks (BP1 and BP3) left to integrate. The remaining options are to cancel the project or to drop the alternative bottleneck block BP3. An indicator function is defined to equal "Continue" if the producer continues, "Cancel" if the producer cancels the project, and "Drop" if the producer drops block BP3. The producer makes the drop and continuation decisions simultaneously, choosing the highest valued of three alternatives: 1) continue and drop block BP3 (continue integrating BP1); 2) continue and keep block BP3 in the design (continue integrating BP1 and BP3); or 3) cancel the project.

Case G

In case G, blocks BP1 and BP2 are being integrated into the chip. A value is defined for the project when there are two blocks left to integrate. The remaining options are to cancel the project, drop the alternative bottleneck block BP2, or switch to block BP3. An indicator function is defined to equal "Continue" if the producer continues, "Cancel" if the producer cancels the project, "Drop" if the producer drops block BP2, and Switch if the producer switches to block BP3. The producer makes the drop, continuation, and switch decisions simultaneously, choosing the highest valued of 4 alternatives: 1) continue and drop block BP2 (integrate BP1); 2) continue and keep block BP2 in the design (integrate BP1 and BP2); 3) continue and switch block BP3 for BP2 (integrate BP1 and BP3); or 4) cancel the project.

Next, in a step 850, the valuations computed in steps 830–840 above can be aggregated to determine a valuation for the entire project. Then, in a decisional step 860, a determination is made whether a higher valuation can be achieved by iterating through steps 800–850. If iteration is desired, then steps 800–850 are performed again. Otherwise, in a step 870, SOC design values determined by steps 800–860 are apportioned among IP Block providers and in a step 880, the valuation for the project is reported as the result.

In the exemplary embodiment of the present invention, NPVs are calculated using Simpson's Rule. In alternative embodiments, one of ordinary skill in the art would recognize many alternative methods for solving the simultaneous equations are possible, for example using analytical methods and numerical methods.

In the exemplary embodiment of the present invention, systems of partial differential equations for Cases A, B, C, D, and E, were solved using the Crank-Nicholson finite difference method. This method is chosen because it is computationally more efficient than the more traditional implicit and explicit finite difference methods. In alternative embodiments, one of ordinary skill in the art would recognize many alternative methods for solving the simultaneous equations are possible, for example using implicit and explicit finite difference methods.

In the exemplary embodiment of the present invention, the three-dimensional partial differential equations for Cases F and G were solved using the alternating direction implicit (ADI) method. In alternative embodiments, one of ordinary skill in the art would recognize many alternative methods for solving the simultaneous equations are possible.

The above process is performed for different configuration of IP blocks. For example, one configuration may include a set of IP blocks that meet a design requirement may include a meta-block BP1, bottleneck block BP2 and alternative BP3; another configuration may include set of IP blocks may include meta-block BP5, bottleneck block BP6 and alternative BP7; etc. The bottlenecks for either configuration may not be the same for each configuration, thus bottleneck block BP2 may include functionality provided in meta-block BP5, thus bottleneck block BP2 could have different functionality than bottleneck block BP6 or BP7.

Figure 12:
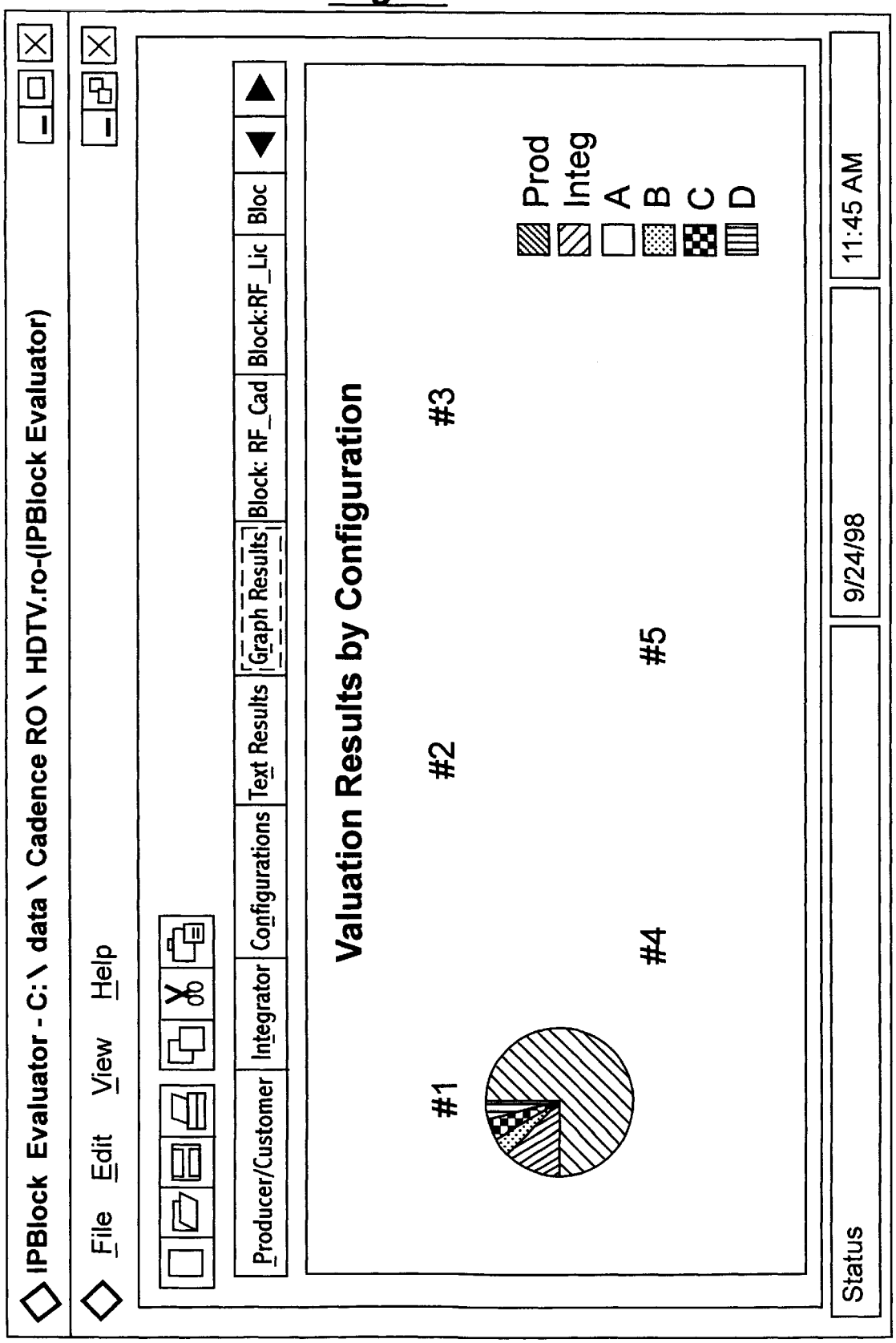
FIG. 12 illustrates a representative example result of an embodiment according to the present invention.

After solving the above simultaneous equations, for each configuration, a valuation is provided for the integrator, the producer, and each block provider. Sample results are illustrated in FIG. 12. The size of the pie charts in FIG. 12 represents the sales for the good, and the percentage of the pie chart represents percentages of the sales for the good.

In many embodiments, time to market analyses are based upon a model that could be used to easily compute the costs associated with time delays of a project.

Further, an impact of lateness on profit can also be determined that leads to understanding how much time is worth.

Figure 13:
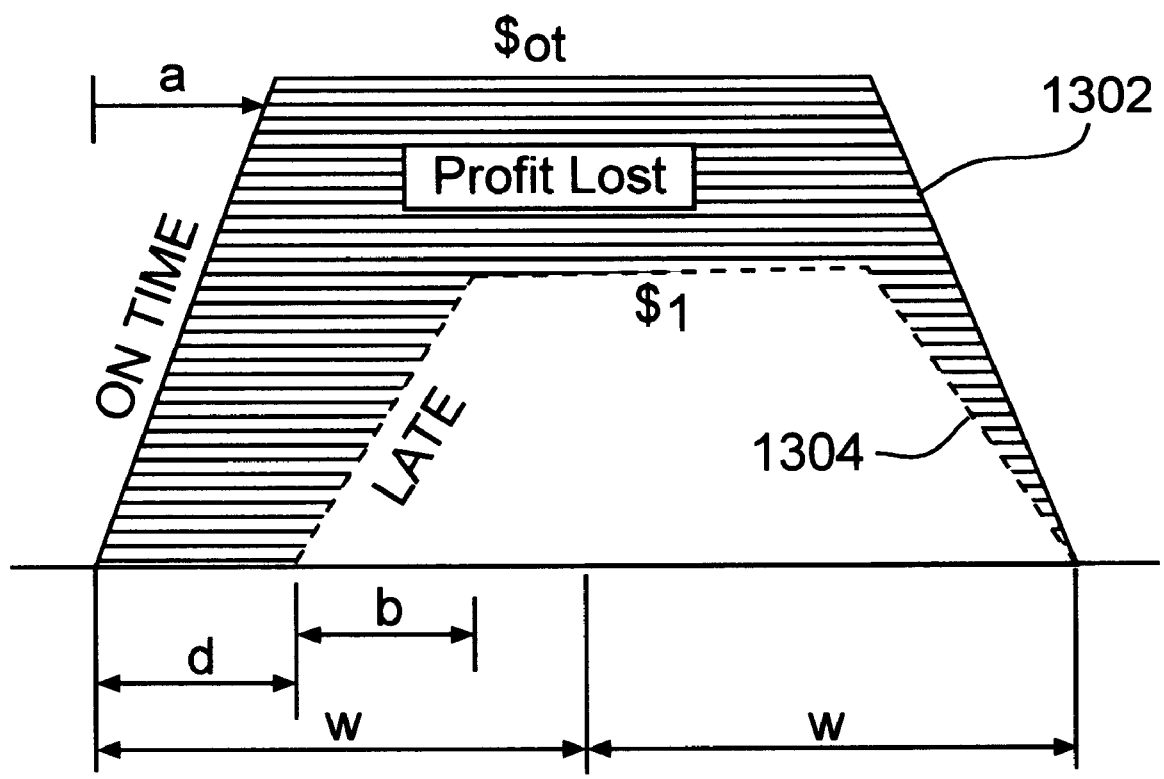
FIG. 13 illustrates a representative example of a time to market analyses in a particular embodiment according to the present invention.

FIG. 13 illustrates two profit profiles. An on-time profile 1302 begins at time equal to zero and rises to the maximum profit level, $ot, over the time period a, the rise time to maximum profit. Profits stay at the elevated level until they fall to zero in the period of time a. Stages of the product life-cycle, such as birth, maturity, and obsolesce, can be represented in the profile. As illustrated in FIG. 13, total product life is 2w, where W, the market window, is the total product life divided by two.

FIG. 13 further illustrates a second profile 1304, obtained by introduction of the same product at a later point in time, d. The product lifecycle is repeated, however the rise and fall to maturity, b, and the late entry profit, $1, take on new values. Total product life, 2w, is reduced by the delay entry time, d. Subtraction of an area under the late profile 1304 from the on-time profile 1302 illustrates a cost of lateness.

The cost of lateness area is produced by two dominant mechanisms: a vertical loss produced by a reduced safes time and a horizontal loss component that results from a loss in market share. Vertical loss, the area lost to the left of the late entry profile, is mostly the result of lost sales produced by being late. These are sales that could have been made, but were lost because the product was not available. Horizontal loss, the area lost above the late entry profile, is mostly the result of lost market share to the competition. Profits in this area are reduced because the market must now be shared with other entrants. Getting to market late equates to missed opportunity, the vertical component, and lost market share to the competition, the horizontal component. The decline to zero profit is the same, because of external factors, for both profiles. Reference may be had to the publication by Ron Kmetovicz, of Time to Market Associates, P.O. Box 160571, Cupertino, Calif. 95016, in Electronic Design column, *Kmet's Korner*, for further reference about time to market revenue analyses.

Conclusion

Although the above has generally described the present invention according to specific embodiments, the present invention has a much broader range of applicability. In particular, the present invention is not limited to a particular kinds of risk factors, but can be applied to any industry model where an improved or optimized analysis is desired for use with valuations of real assets. Thus, in some embodiments, the techniques of the present invention could provide valuations for many different kinds of business, governmental and educational endeavors of all kinds. Of course, one of ordinary skill in the art would recognize other variations, modifications, and alternatives.

What is claimed is:

1. A method for determining a group of IP Blocks from a first plurality of IP Blocks to incorporate into a circuit design, the method comprising:

determining a circuit architecture to be implemented by the circuit design;

determining an architecture profile for implementing the circuit architecture;

determining a first design profile for designing the circuit architecture with a first group of IP Blocks from the first plurality of IP Blocks, and a second design profile for designing the circuit architecture with a second group of IP Blocks from the first plurality of IP Blocks;

determining a first integration profile for implementing a first implementation of the circuit architecture with the first group of IP Blocks, and a second integration profile for implementing a second implementation of the circuit architecture with the second group of IP Blocks;

determining a first verification profile for verifying the first implementation of the circuit architecture, and a second verification profile for verifying the second implementation of the circuit architecture;

determining a first technical profile for the circuit architecture with the first implementation in response to the architecture profile, to the first design profile, the first integration profile and the first verification profile;

determining a second technical profile for the circuit architecture with the second implementation in response to the architecture profile, the second design profile, the second integration profile and the second verification profile; and selecting one of said first and said second groups of IP blocks as the group of IP blocks.

2. The method of claim 1 further comprising:

determining a target market valuation for the circuit design;

determining a first licensing valuation for the first implementation of the circuit architecture with the first group of IP Blocks, and a second licensing valuation for the second implementation of the circuit architecture with the second group of IP Blocks; and determining a first time-to-market valuation for the first implementation of the circuit architecture with the first group of IP Blocks, and a second time-to-market valuation for the second implementation of the circuit architecture with the second group of IP Blocks;

wherein the first technical profile for the circuit architecture with the first implementation is also determined in response to the target market valuation, the first licensing valuation and the first time-to market valuation;

wherein the second technical profile for the circuit architecture with the second implementation is also determined in response to the target market valuation, the second licensing valuation and the second time-to market valuation.

3. The method of claim 2 further comprising: determining a first target segment infringement valuation for the first implementation of the circuit architecture with the first group of IP Blocks, and a second target segment infringement valuation for the second implementation of the circuit architecture with the second group of IP Blocks;

determining a first target segment injunction valuation for the first implementation of the circuit architecture with the first group of IP Blocks, and a second target segment injunction valuation for the second implementation of the circuit architecture with the second group of IP Blocks; and determining a first target segment economic valuation for the first implementation of the circuit architecture with the first group of IP Blocks, and a second target segment economic valuation for the second implementation of the circuit architecture with the second group of IP Blocks;

wherein the first technical profile for the circuit architecture with the first implementation is also determined in response to the first target segment infringement valuation, the first target segment injunction valuation, and the first target segment economic valuation;

wherein the second technical profile for the circuit architecture with the second implementation is also determined in response to the second target segment infringement valuation, the second target segment injunction valuation, and the second target segment economic valuation.

4. A computer program product for determining a group of IP Blocks from a first plurality of IP Blocks to incorporate into a circuit design having a desired objective, the computer program product comprising:

code that directs the processor to determine a circuit architecture to be implemented by the circuit design;

code that directs the processor to determine an architecture profile for implementing the circuit architecture;

code that directs the processor to determine a first design profile for designing the circuit architecture with a first group of IP Blocks from the first plurality of IP Blocks, and a second design profile for designing the circuit architecture with a second group of IP Blocks from the first plurality of IP Blocks;

code that directs the processor to determine a first integration profile for implementing a first implementation of the circuit architecture with the first group of IP Blocks, and a second integration profile for implementing a second implementation of the circuit architecture with the second group of IP Blocks;

code that directs the processor to determine a first verification profile for verifying the first implementation of the circuit architecture, and a second verification profile for verifying the second implementation of the circuit architecture;

code that directs the processor to determine a first technical profile for the circuit architecture with the first implementation in response to the architecture profile, to the first design profile, the first integration profile and the first verification profile;

code that directs the processor to determine a second technical profile for the circuit architecture with the second implementation in response to the architecture profile, the second design profile, the second integration profile and the second verification profile;

code that directs the processor to select the first group of IP Blocks as the group of IP Blocks when the first design profile better meets or exceeds the desired objective than does the second design profile; and a computer readable storage medium for containing the codes.

5. The computer program product of claim 4 further comprising:

code that directs the processor to determine a target market valuation for the circuit design;

code that directs the processor to determine a first licensing valuation for the first implementation of the circuit architecture with the first group of IP Blocks, and a second licensing valuation for the second implementation of the circuit architecture with the second group of IP Blocks; and code that directs the processor to determine a first time-to-market valuation for the first implementation of the circuit architecture with the first group of IP Blocks, and a second time-to-market valuation for the second implementation of the circuit architecture with the second group of IP Blocks;

wherein the first technical profile for the circuit architecture with the first implementation is also determined in response to the target market valuation, the first licensing valuation and the first time-to market valuation;

wherein the second technical profile for the circuit architecture with the second implementation is also determined in response to the target market valuation, the second licensing valuation and the second time-to market valuation.

6. The computer program product of claim 4 further comprising:

code that directs the processor to determine a first target segment infringement valuation for the first implementation of the circuit architecture with the first group of IP Blocks, and a second target segment infringement valuation for the second implementation of the circuit architecture with the second group of IP Blocks;

code that directs the processor to determine a first target segment injunction valuation for the first implementation of the circuit architecture with the first group of IP Blocks, and a second target segment injunction valuation for the second implementation of the circuit architecture with the second group of IP Blocks; and code that directs the processor to determine a first target segment economic valuation for the first implementation of the circuit architecture with the first group of IP Blocks, and a second target segment economic valuation for the second implementation of the circuit architecture with the second group of IP Blocks;

wherein the first technical profile for the circuit architecture with the first implementation is also determined in response to the first target segment infringement valuation, the first target segment injunction valuation, and the first target segment economic valuation;

wherein the second technical profile for the circuit architecture with the second implementation is also determined in response to the second target segment infringement valuation, the second target segment injunction valuation, and the second target segment economic valuation.

7. An apparatus for determining a group of IP Blocks from a first plurality of IP Blocks to incorporate into a circuit design having a desired objective, the apparatus comprising:

means for determining a circuit architecture to be implemented by the circuit design;

means for determining an architecture profile for implementing the circuit architecture;

means for determining a first design profile for designing the circuit architecture with a first group of IP Blocks from the first plurality of IP Blocks, and a second design profile for designing the circuit architecture with a second group of IP Blocks from the first plurality of IP Blocks;

means for determining a first integration profile for implementing a first implementation of the circuit architecture with the first group of IP Blocks, and a second integration profile for implementing a second implementation of the circuit architecture with the second group of IP Blocks;

means for determining a first verification profile for verifying the first implementation of the circuit architecture, and a second verification profile for verifying the second implementation of the circuit architecture;

means for determining a first technical profile for the circuit architecture with the first implementation in response to the architecture profile, to the first design profile, the first integration profile and the first verification profile;

means for determining a second technical profile for the circuit architecture with the second implementation in response to the architecture profile, the second design profile, the second integration profile and the second verification profile; and means for using the first group of IP Blocks as the group of IP Blocks when the first design profile better meets or exceeds the desired objective than does the second design profile.

8. The apparatus of claim 7 further comprising:

means for determining a target market valuation for the circuit design;

means for determining a first licensing valuation for the first implementation of the circuit architecture with the first group of IP Blocks, and a second licensing valuation for the second implementation of the circuit architecture with the second group of IP Blocks; and means for determining a first time-to-market valuation for the first implementation of the circuit architecture with the first group of IP Blocks, and a second time-to-market valuation for the second implementation of the circuit architecture with the second group of IP Blocks;

wherein the first technical profile for the circuit architecture with the first implementation is also determined in response to the target market valuation, the first licensing valuation and the first time-to market valuation;

wherein the second technical profile for the circuit architecture with the second implementation is also determined in response to the target market valuation, the second licensing valuation and the second time-to market valuation.

9. The apparatus of claim 8 further comprising:

means for determining a first target segment infringement valuation for the first implementation of the circuit architecture with the first group of IP Blocks, and a second target segment infringement valuation for the second implementation of the circuit architecture with the second group of IP Blocks;

means for determining a first target segment injunction valuation for the first implementation of the circuit architecture with the first group of IP Blocks, and a second target segment injunction valuation for the second implementation of the circuit architecture with the second group of IP Blocks; and means for determining a first target segment economic valuation for the first implementation of the circuit architecture with the first group of IP Blocks, and a second target segment economic valuation for the second implementation of the circuit architecture with the second group of IP Blocks;

wherein the first technical profile for the circuit architecture with the first implementation is also determined in response to the first target segment infringement valuation, the first target segment injunction valuation, and the first target segment economic valuation;

wherein the second technical profile for the circuit architecture with the second implementation is also determined in response to the second target segment infringement valuation, the second target segment injunction valuation, and the second target segment economic valuation.

10. A computer system for determining a group of IP Blocks from a first plurality of IP Blocks to incorporate into a circuit design having a desired objective, the computer system comprising:

a memory;

a bus;

a processor, connected to the memory by the bus, the processor operatively disposed to:

determine a circuit architecture to be implemented by the circuit design;

determine an architecture profile for implementing the circuit architecture;

determine a first design profile for designing the circuit architecture with a first group of IP Blocks from the first plurality of IP Blocks, and a second design profile for designing the circuit architecture with a second group of IP Blocks from the first plurality of IP Blocks;

determine a first integration profile for implementing a first implementation of the circuit architecture with the first group of IP Blocks, and a second integration profile for implementing a second implementation of the circuit architecture with the second group of IP Blocks;

determine a first verification profile for verifying the first implementation of the circuit architecture, and a second verification profile for verifying the second implementation of the circuit architecture;

determine a first technical profile for the circuit architecture with the first implementation in response to the architecture profile, to the first design profile, the first integration profile and the first verification profile;

determine a second technical profile for the circuit architecture with the second implementation in response to the architecture profile, the second design profile, the second integration profile and the second verification profile; and use the first group of IP Blocks as the group of IP Blocks when the first design profile better meets or exceeds the desired objective than does the second design profile.

11. The computer system of claim 10 wherein the processor is further operative to:
  determine a target market valuation for the circuit design;
  determine a first licensing valuation for the first implementation of the circuit architecture with the first group of IP Blocks, and a second licensing valuation for the second implementation of the circuit architecture with the second group of IP Blocks; and
  determine a first time-to-market valuation for the first implementation of the circuit architecture with the first group of IP Blocks, and a second time-to-market valuation for the second implementation of the circuit architecture with the second group of IP Blocks;
  wherein the first technical profile for the circuit architecture with the first implementation is also determined in response to the target market valuation, the first licensing valuation and the first time-to market valuation;
  wherein the second technical profile for the circuit architecture with the second implementation is also determined in response to the target market valuation, the second licensing valuation and the second time-to market valuation.

12. The computer system of claim 11 wherein the processor is further operative to:
  determine a first target segment infringement valuation for the first implementation of the circuit architecture with the first group of IP Blocks, and a second target segment infringement valuation for the second implementation of the circuit architecture with the second group of IP Blocks;
  determine a first target segment injunction valuation for the first implementation of the circuit architecture with the first group of IP Blocks, and a second target segment injunction valuation for the second implementation of the circuit architecture with the second group of IP Blocks; and
  determine a first target segment economic valuation for the first implementation of the circuit architecture with the first group of IP Blocks, and a second target segment economic valuation for the second implementation of the circuit architecture with the second group of IP Blocks;
  wherein the first technical profile for the circuit architecture with the first implementation is also determined in response to the first target segment infringement valuation, the first target segment injunction valuation, and the first target segment economic valuation;
  wherein the second technical profile for the circuit architecture with the second implementation is also determined in response to the second target segment infringement valuation, the second target segment injunction valuation, and the second target segment economic valuation.

13. The method of claim 1, wherein said selecting step comprises comparing said first and said second technical profiles to determine which of said first and said second groups of IP blocks best meets or exceeds a desired objective.

14. The method of claim 1, wherein said selecting step comprises comparing said first and said second design profiles to determine which of said first and said second groups of IP blocks best meets or exceeds a desired objective.

15. The method of claim 13, wherein said desired objective comprises creating a maximum license revenue for the group of IP blocks.

16. The method of claim 13, wherein said desired objective comprises creating a minimum license revenue for the group of IP blocks.

17. The method of claim 1, further comprising assigning values to each of said plurality of IP blocks in the group of IP blocks.

18. The method of claim 1, further comprising determining a first bottleneck IP block in the first group of IP blocks and replacing said first bottleneck IP block with an alternative IP block.

* * * * *